US008271355B2

(12) United States Patent
Johnson et al.

(10) Patent No.: US 8,271,355 B2
(45) Date of Patent: Sep. 18, 2012

(54) SALES FORCE AUTOMATION SYSTEM AND METHOD

(75) Inventors: Jerome Dale Johnson, North Mankato, MN (US); David Robert Lundberg, Mankato, MN (US); Michael Paul Krebsbach, Aerdenhout (NL)

(73) Assignee: SFA Systems, LLC, Tyler, TX (US)

( * ) Notice: Subject to any disclaimer, the term of this patent is extended or adjusted under 35 U.S.C. 154(b) by 0 days.

(21) Appl. No.: 13/093,802

(22) Filed: Apr. 25, 2011

(65) Prior Publication Data

US 2011/0258081 A1    Oct. 20, 2011

Related U.S. Application Data

(60) Continuation of application No. 12/412,455, filed on Mar. 27, 2009, now Pat. No. 7,941,341, which is a continuation of application No. 11/929,548, filed on Oct. 30, 2007, now Pat. No. 7,516,088, which is a division of application No. 11/537,953, filed on Oct. 2, 2006, now abandoned, which is a continuation of application No. 09/566,872, filed on May 8, 2000, now abandoned, which is a continuation of application No. 08/550,089, filed on Oct. 30, 1995, now Pat. No. 6,067,525.

(51) Int. Cl.
*G06Q 40/00* (2006.01)
(52) U.S. Cl. ............................ 705/26.81; 705/30
(58) Field of Classification Search ................ 705/10–44
See application file for complete search history.

(56) References Cited

U.S. PATENT DOCUMENTS

| 4,128,758 A | 12/1978 | Bukowski et al. |
|---|---|---|
| 4,359,631 A | 11/1982 | Lockwood et al. |
| 4,377,741 A | 3/1983 | Brekka et al. |
| 4,466,001 A | 8/1984 | Moore et al. |
| 4,500,880 A | 2/1985 | Gomersall et al. |
| 4,553,206 A | 11/1985 | Smutek et al. |
| 4,558,211 A | 12/1985 | Berstein |
| 4,591,983 A | 5/1986 | Bennett et al. |
| 4,616,327 A | 10/1986 | Rosewame et al. |
| 4,670,798 A | 6/1987 | Campbell et al. |
| 4,706,212 A | 11/1987 | Toma |
| 4,734,858 A | 3/1988 | Schlafly |

(Continued)

FOREIGN PATENT DOCUMENTS

EP    0344976    12/1989

(Continued)

OTHER PUBLICATIONS

John Hiatt, "Empowering the Global Sales Force," International Business, vol. 7, No. 9, pp. 16-20, Sep. 1994.

(Continued)

*Primary Examiner* — Frantzy Poinvil
(74) *Attorney, Agent, or Firm* — Tarek N. Fahmi, APC

(57) ABSTRACT

A sales force automation system and method of facilitating a sales process which integrates computerized intelligent automated salesperson support for multiple phases of the sales process. Various subsystems may be provided to facilitate the sales process which may include pre-sales lead generation, maximize time spent with the customer, effectively manage an order, ensure customer satisfaction and retain the customer for future sales. Also provided to support the phases of the sales process are additional tools, integrated in the system. The additional tools may include self management subsystems, sales management subsystems and training subsystems.

7 Claims, 30 Drawing Sheets

U.S. PATENT DOCUMENTS

| | | | |
|---|---|---|---|
| 4,775,935 A | | 10/1988 | Yourick |
| 4,863,384 A | | 9/1989 | Slade |
| 4,887,208 A | | 12/1989 | Schneider et al. |
| 4,899,292 A | | 2/1990 | Montagna et al. |
| 4,899,299 A | | 2/1990 | MacPhail |
| 4,905,094 A | | 2/1990 | Pocock et al. |
| 4,931,944 A | | 6/1990 | Richter et al. |
| 4,958,292 A | | 9/1990 | Kaneko et al. |
| 4,972,318 A | | 11/1990 | Brown et al. |
| 4,984,155 A | | 1/1991 | Geier et al. |
| 4,992,939 A | | 2/1991 | Tyler |
| 4,992,940 A | | 2/1991 | Dworkin |
| 5,053,956 A | | 10/1991 | Donald et al. |
| 5,056,029 A | | 10/1991 | Cannon |
| 5,072,536 A | | 12/1991 | Matthews et al. |
| 5,088,045 A | | 2/1992 | Shimanaka et al. |
| 5,089,970 A | * | 2/1992 | Lee et al. .................. 700/96 |
| 5,099,422 A | | 3/1992 | Forseman et al. |
| 5,103,498 A | | 4/1992 | Lanier et al. |
| 5,117,354 A | | 5/1992 | Long et al. |
| 5,172,314 A | | 12/1992 | Poland et al. |
| 5,191,522 A | | 3/1993 | Bosco et al. |
| 5,212,634 A | | 5/1993 | Washizaki et al. |
| 5,225,987 A | | 7/1993 | Thompson |
| 5,241,464 A | | 8/1993 | Greulich et al. |
| 5,270,922 A | | 12/1993 | Higgins |
| 5,283,865 A | | 2/1994 | Johnson |
| 5,309,355 A | | 5/1994 | Lockwood |
| 5,353,219 A | | 10/1994 | Mueller et al. |
| 5,367,452 A | | 11/1994 | Gallery et al. |
| 5,493,490 A | | 2/1996 | Johnson |
| 5,504,675 A | | 4/1996 | Cragun et al. |
| 5,515,524 A | | 5/1996 | Lynch et al. |
| 5,523,942 A | | 6/1996 | Tyler et al. |
| 5,544,230 A | * | 8/1996 | Megyesi .................. 379/67.1 |
| 5,545,524 A | | 8/1996 | Trent et al. |
| 5,570,291 A | | 10/1996 | Dudle et al. |
| 5,576,951 A | | 11/1996 | Lockwood |
| 5,627,973 A | | 5/1997 | Armstrong et al. |
| 5,657,233 A | | 8/1997 | Cherrington et al. |
| 5,664,182 A | | 9/1997 | Nierenberg et al. |
| 5,708,798 A | | 1/1998 | Lynch et al. |
| 5,727,164 A | | 3/1998 | Kaye et al. |
| 5,825,651 A | | 10/1998 | Gupta et al. |
| 5,844,554 A | | 12/1998 | Geller et al. |
| 5,852,812 A | | 12/1998 | Reeder |
| 5,873,069 A | | 2/1999 | Reuhl et al. |
| 5,878,401 A | | 3/1999 | Joseph |
| 5,898,777 A | | 4/1999 | Tycksen et al. |
| 5,974,405 A | | 10/1999 | McGuinness et al. |
| 5,999,908 A | | 12/1999 | Abelow |
| 6,064,982 A | | 5/2000 | Puri |
| 6,067,525 A | * | 5/2000 | Johnson et al. ............ 705/7.13 |
| 6,101,483 A | | 8/2000 | Petrovich et al. |
| 6,122,630 A | | 9/2000 | Strickler et al. |
| 6,141,598 A | | 10/2000 | Nam |
| 6,347,303 B2 | * | 2/2002 | Nagai et al. ............... 705/7.14 |
| 6,484,149 B1 | | 11/2002 | Jammes et al. |
| 6,820,062 B1 | | 11/2004 | Gupta et al. |
| 6,963,854 B1 | | 11/2005 | Boyd et al. |
| 7,287,004 B2 | * | 10/2007 | Kenny et al. ............... 705/26.8 |
| 7,606,742 B2 | * | 10/2009 | Bright et al. ................. 705/28 |
| 7,797,217 B2 | * | 9/2010 | Rosen et al. .............. 705/36 R |
| 7,949,578 B2 | * | 5/2011 | Johnson et al. .............. 705/30 |
| 2005/0043980 A1 | * | 2/2005 | Edlin et al. .................. 705/8 |
| 2010/0257012 A1 | * | 10/2010 | Walker et al. ................. 705/9 |
| 2010/0312611 A1 | * | 12/2010 | Henderson et al. .......... 705/10 |

FOREIGN PATENT DOCUMENTS

| | | |
|---|---|---|
| GB | 2177245 | 1/1987 |
| GB | 2105075 | 4/1992 |
| WO | 8503152 | 7/1985 |

OTHER PUBLICATIONS

Tony Seideman, "Way Cool! (Sales Force Automation)", Sales & Marketing Management, vol. 146, No. 6, pp. 10-13, Jun. 1994.

Tom Negrino, "Sales-Automation Software", Macworld, vol. 10, No. 10, pp. 144-148, Oct. 1993.

Tom Negrino, "Market Master Manager 3.5", Macworld, vol. 10, No. 10, p. 57, Oct. 1993.

Colleen Frye, Automation Integrating Phases of Sales Cycle, Software Magazine, v 13, n 14, pp. 61-72, Sep. 1993.

Truck Force Tools Sales and Training System Operator's Manual, Ford Trucks, Clear With Computers, 1992.

ISIS Isuzu Sales Information System, Australia, ISIS Operator's Manual, Clear With Computers, 1992.

Detroit Diesel Corporation, Bus Upgraded System Operator's Manual, Clear With Computers, 1990.

WhiteGMC Volvo, TruckMatch Read Me First, TruckMatch, Clear With Computers, 1990.

GM Truck Compass, Read Me First, Operator's Manual, Clear With Computers, 1991.

Bob Gatty—"Setting Up Shop on Computer Screens", Nation's Business, Mar. 1984, pp. 57-58.

Lois Schneider—"On Your Screen!", EPB, vol. 2, No. 5, Sep. 1984, pp. 14-16.

Larry Riggs—"Direct Marketing Goes Electronic", S&MM, Jan. 14, 1985, pp. 59-60.

Emily Leinfuss—"'Infowindow Display' Shown by IBM at NCC", Management Info. Sys. Week. Jun. 23, 1986, p. 25.

Rozen, "Electronic Stores Sell: Shoes to Cars", Dun's Business Month, vol. 125, p. 101, Jan. 1985.

Videodisc Product Search System Launched for Architects and Interior Designers, Videodisc and Optical Disk, Jul.-Aug. 1985, vol. 5, No. 4, pp. 244-247.

"Touchcom.TM. Interactive Videodisc Catalog Markets Furniture at Dayton's", Videodisc and Optical Disk, vol. 5, No. 5, Sep.-Oct. 1985, pp. 343-345.

Paul Hurly, Boosting Sales . . . Electronically, Industry Week, Mar. 31, 1986, pp. 33-35.

"Hot to Make the Most of EPIC", user's guide, Electronic Product Information, Buick Motor Division, 902 East Hamilton Avenue, Flint, Michigan 48550.

Ronnie Telzer; The Silent Salesman-, Marketing Communications, vol. 14, No. 5, May 1989, pp. 20-24.

Mary Beth Vander Schaaf, Dealing With Dealers, Automotive News, Nov. 21, 1988, p. 67.

Jeffrey Young, "Can Computers Really Boost Sales?", Forbes ASAP, Aug. 28, 1995, pp. 85-98.

Product Catalog, Calico Technology, Inc., 1995 (12 pages).

SalesBUILDER Product Catalog, Triology Development Group, 1995 (11 pages).

Saratoga Systems, Inc. Product Catalog, "An Account Management and Sales Information System," Saratoga Systems, Inc., 1994 (10 pages).

Siebel Sales Information Systems Product Catalog, Siebel Systems, Inc., 1995 (8 pages).

Volpe, Welty & Company Equity Research—Concetra, dated Mar. 28, 1995, Concentra's SalesGenerator.TM., (18 pages), Volpe, Welty & Company, 1995 (18 pages).

"EPIC Quick Reference Flip Chart", Buick Motor Division, General Motors Corporation (1986).

"Training Wizard" Advertisement, Feb. 1997 Issue of Training Magazine, vol. 34, No. 2.

"Training Server" Advertisement, Feb. 1997 Issue of Training Magazine, vol. 34, No. 2.

Ingenium 3.0 and Ingenium Messenger Advertisement, Feb. 1997 Issue of Training Magazine, vol. 34, No. 2.

"Ontrack for Training" Advertisement, Feb. 1997 Issue of Training Magazine, vol. 34, No. 2.

"CornerStone" Article, Feb. 1997 Issue of Training Magazine, vol. 34, No. 2.

"Registrar" Advertisement, Feb. 1997 Issue of Training Magazine, vol. 34, No. 2.

"EduSys 2000" Advertisement, Feb. 1997 Issue of Training Magazine, vol. 34, No. 2.

"Procedureware (R)" Advertisement, Feb. 1997 Issue of Training Magazine, vol. 34, No. 2.

Shari Caudron, "Sales-Force Automation Comes of Age. (include related article on how Hewlett-Packard Co. Computer Systems implemented technology enabled selling applications)", Industry Week, May 1996, vol. 245, No. 10, pp. 146.

Weidner, Davis, "HVAC Manufacturers See the Need for Sales Automation Software. (Heating, Ventilation, Air Conditioning Equipment Makers, Other Companies Improve Customized Selling)", Air Conditioning, Heating & Refrigeration News, vol. 199, No. 8, p. 10.

Dialog File 16 (Database PROMT(R)), No. 6170712, "IBM's AS/400 division and CWC release new, interactive sales system; New version of 'PSAS' distributed to 2,000 sales people and business partners", Business Wire, 2 pages.

W. Close, Garner Group, Inc., Conference Presentation, Florida Symposium, pp. 1-18 (1997).

Dan Dietz, "Customer-Driven Engineering", Mechanical Engineering, May 1996, vol. 118, No. 5, p. 68.

Burnbrier, "Making More Time for Sales", American Agent & Broker, Apr. 1991, 63, 4. p. 24.

Taylor, "The Automated Wake-Up Call", Sales and Marketing Management, Aug. 1996, 145, 9.

* cited by examiner

| | Time With Customer | | | | | | | | Self Management | | | | | | | Training | | | Pre-Sales | | Order Management | | Customer Retention | | Sales Management | | | |
|---|---|---|---|---|---|---|---|---|---|---|---|---|---|---|---|---|---|---|---|---|---|---|---|---|---|---|---|---|
| Local Information Storage | Customer | Prospect | Contacts | Opportunities | Follow-up Cycle | Literature | Proposals | Presentations | Opportunity | Schedule | Contacts | Products | To-do | Expenses | Communications | Reference Library | System | Products | Skills | Kiosk | Leads | Order Submit | Directed Marketing | | Opportunity | Contacts | Finances | Communications | |
| Salesperson Passwords | # | # | # | # | # | # | # | # | # | # | # | # | # | # | # | | | | | | | | | # | # | # | # |
| Salesperson Privileges | # | # | # | # | # | # | # | # | # | # | # | # | # | # | # | | | | | | | | | # | # | # | # |
| Proposal Templates | | | | | | # | | | | | | | | | | | | | | | | | | | | | |
| Presentation Templates | | | | | | | # | | | | | | | | | | | | | | | | | | | | |
| Finance Plan Parameters | | | | | # | | | | | | | | | | | | | | | | | | | | | | |
| Finance Plan Defaults | | | | | # | | | | | | | | | | | | | | | | | | | | | | |
| Quote Tax Defaults | | | # | | | | | | | | | | | | | | | | | | | | | | | | |
| Quote Profit Margin Defaults | | | # | | | | | | | | | | | | | | | | | | | | | | | | |
| Default Model Configuration | | # | | | | | | | | | | | | | | | | | | # | | | | | | | |
| Presentation Info | | | | | | | | | | | | | | | | | | | | | | | | | | | |
| Template Definition | | | | | | | # | | | | | | | | | | | | | | | | | | | | |
| Setup Definition | | | | | | | # | | | | | | | | | | | | | | | | | | | | |
| Slide Contents | | | | | | | # | | | | | | | | | # | | | | | | | | | | # | |
| Proposal Info | | | | | | | | | | | | | | | | | | | | | | | | | | | |
| Template Definition | | | | | | # | | | | | | | | | | | | | | | | | | | | | |
| Setup Definition | | | | | | # | | | | | | | | | | | | | | | | | | | | | |
| Report Contents | | | | | | # | | | | | | | | | | | | | | | | | | | | # | |

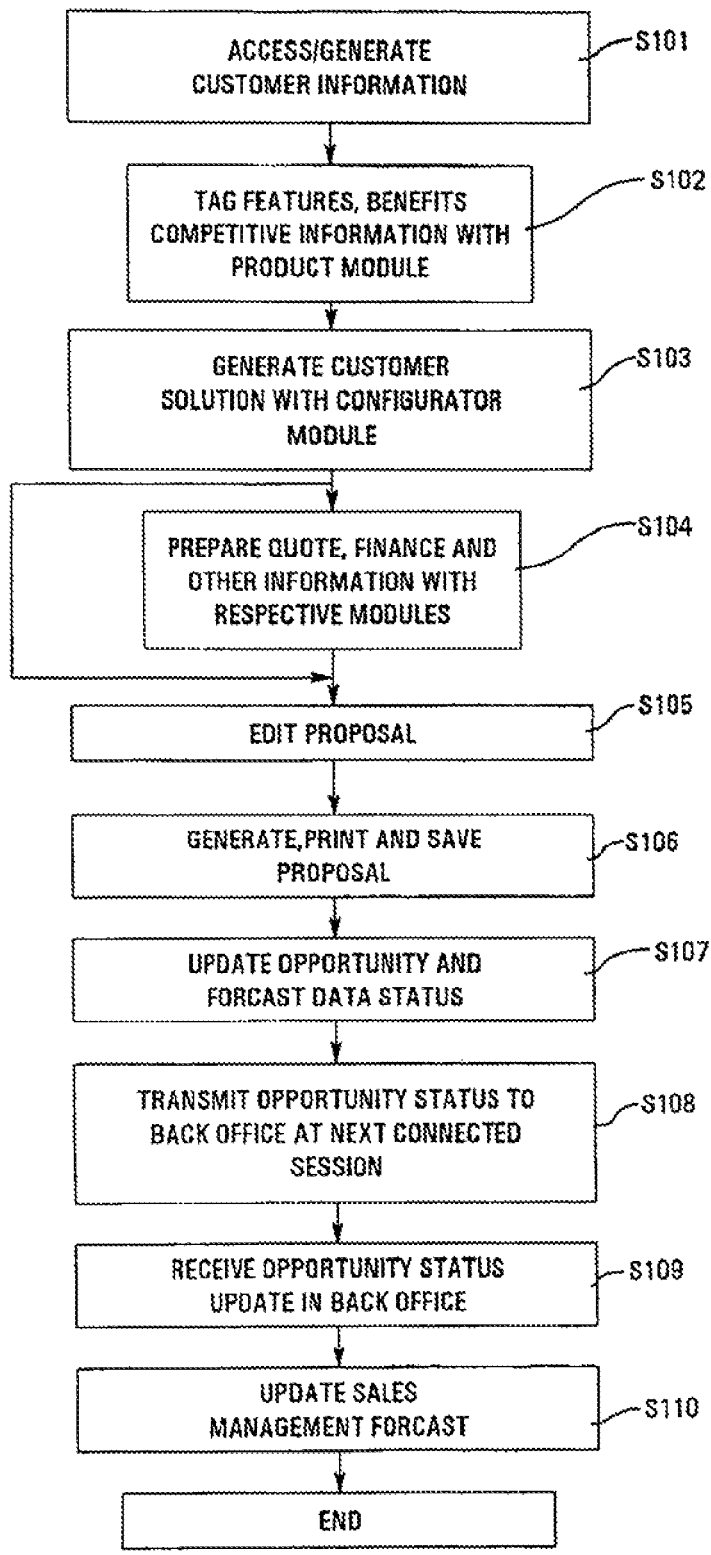

Fig.21A

| Component | Event | Related Module | "Paired" Event - System Intelligence EXAMPLES |
|---|---|---|---|
| 1. Pre-Sales (Lead Management) | a) Salesperson identifies leads for particular products | Contact Management | Linked to 1(d) and 1(e) to bring leads to the salesperson and to 3(a, b, f,) to notify salesperson of the recommended actions and process |
| | b) A directed mailing for a particular product is sent out | Contact Management, Product | Linked to 1(a), 2(a), and 2(c) to send out product information targeted at the specific market audience |
| | c) Promotional materials on new incentive program for product are mailed out | Contact Management | Linked to 2(c), 2(h), and 5(a) to send out information on new incentive program to customers to which proposals for the product have been generated but an order is not yet submitted. |
| | d) A customer contacts an Internet Web-site to get product information | Product | Linked to 1(a) and 3(a) to notify to salesperson of the contact and schedule a follow-up and to 2(a) to communicate known requirements directly to the sales person |
| | e) A customer uses a kiosk to gain information on a product or service and request follow-up call from company representative | | Linked to 1(a) and 3(a) to notify to salesperson of the contact and schedule a follow-up and to 2(a) to communicate known requirements directly to the sales person |
| | f) Salesperson profiles the lead based on key criteria | Contact Management, Product | Linked to 2(a) and 1(d, e) to profile the client according to best recommended practices |
| | g) Salesperson identifies a lead as "qualified" and begins the sales process to close the sale | Objective Management, Contact Management, Time Management | Linked to 3(a, i) to prompt the salesperson to schedule follow-up<br>Linked to 1(f) and 3(f) to assign an appropriate process with steps to close the sale<br>Linked to 3(d) and 7(a) to revise the forecast based on the new sales opportunity |
| | h) *Salesperson fails to make any initial contact or follow-up to a qualified lead* | | Linked to 7(b, c, e) to advise the sales manager of this inactivity.<br>Linked to 3(j) to automatically add a training element into the salesperson's curriculum and schedule |
| 2. Time With the Customer | a) Salesperson interacts with the customer to build a needs analysis | Contact Management, Configurator | Linked to 2(c-g) which enables the system to use the profile information to direct or limit available solutions |
| | b) Salesperson presents product and service information (features and benefits) to the customer | Product | Linked to 3(f) to identify this step of the sales process as complete |
| | c) Salesperson configures a product and service solution for a customer | Configurator | |

Fig.21B

| Component | Event | Related Module | "Paired" Event - *System Intelligence* |
|---|---|---|---|
| 2. Time With the Customer | d) Salesperson verifies the accuracy and applicability of the solution with business requirements and customer requirements | Configurator, Contact Management | • Linked to 2(c), the system will prompt the salesperson for additional information to assure the best solution has been identified |
| | e) Salesperson calculates a total cost of the solution for the customer based on quantity, discounts, taxes, programs, etc. | Quote | |
| | f) Salesperson identifies purchasing and financing options for the product(s) offered to the customer | Finance | |
| | g) Salesperson identifies delivery options and timing for the solution by reviewing available inventory or manufacturing slots | Inventory | |
| | h) Salesperson prints a proposal for a customer | Proposal | • The system marks the sales step as complete (3f), recalculates the probability of closing the sale(3d, 7a) and prompts the salesperson to accept or confirm the schedule for the follow-up (3i). |
| | i) Salesperson presents the proposed product and service solution to other decision makers at the customer | Presentation | • The system marks the sales step as complete (3f), recalculates the probability of closing the sale(3d, 7a) and prompts the salesperson to accept or confirm the schedule for the follow-up (3i). |
| | j) *A salesperson frequently fails to offer creative finance options when proposing a finance payment for a product purchase* | | • The system adds and schedules a required product training item to the training curriculum; linked to 6(a, b) |
| | k) *A salesperson's frequency of proposing a particular product or service is below the geographic or divisional norm* | | • The system adds and schedules a required product training item to the training curriculum; linked to 6(a, b) |

Columns: 2101, 2102, 2103, 2104

Fig. 21C

| Component | Event | Related Module | "Paired" Event - System Intelligence |
|---|---|---|---|
| 3. Self-Management | a) Salesperson qualifies a lead and schedules a customer visit | Contact Management, Time Management | • Linked to 1(a, g) for lead qualification, 3(f) to assign a process for closing the sale, 3(i) to schedule the process steps, and to 3(d) and 7(a) to trigger a change to the calculated forecast |
| | b) Salesperson creates a prioritized list of contacts and customers | Objective Management | |
| | c) Salesperson creates a list of active sales opportunities | Objective Management, Contact Management | • Linked with 3(d) and 7(a) to calculate a forecast |
| | d) Salesperson develops a forecast | Forecasting | • Linked to all steps of the sales process and subsequently linked to 3(d) and 7(a) to calculate maintain an accurate forecast relative to process status |
| | e) Salesperson identifies sales objectives | Objective Management | • Linked to 3(d, f) to track against the forecast and 3(c) to check status |
| | f) Salesperson completes planned steps of a process related to closing a sale | Objective Management | • Linked to all steps of the sales process and subsequently linked to 3(d) and 7(a) to calculate maintain an accurate forecast relative to process status |
| | g) Salesperson calculates commission | Forecasting | • Automated by links to sales manager 7(a-d) |
| | h) Salesperson reports sales status and contact history to sales manager | Forecasting, Contact Management | • Linked to all aspects of the sales process |
| | i) Salesperson and customer generate an action item (task) for follow-up | Time Management | • Linked to 3(i), 6(b-d), and 7(e) Linked to other sales processes by systematically identifying areas for improvement and scheduling targeted training |
| | j) Salesperson schedules time to meet training requirements | Time Management, Training | • Linked to 2(f) to automatically identify the date of pay-off |
| | k) Salesperson schedules a sales call follow-up for sixty days before the end of a customers financing pay-off date | Time Management | • The system adds and schedules a required skills training item to the training curriculum; linked to 6(a, b) |
| | l) A salesperson's length of time to close a sales is significantly longer than the norm | | |

Fig.21D

| Component | Event | Related Module | "Paired" Event - *System Intelligence* |
|---|---|---|---|
| 3. Self-Management | m) *A salesperson's profit per sale is significantly lower than the norm* | | • The system adds and schedules a required skills training item to the training curriculum; linked to 6(a, b) |
| 4. Customer Retention | a) Salesperson maintains a list of customers that have purchased product | Contact Management, Order Management | • Linked to 5(a,b) to mark contacts and sales opportunities as current customers |
| | b) Salesperson follows-up on customer satisfaction | Objective Management, Contact Management | • Linked to 3(f) to track recommended steps t identify new opportunities at existing customers |
| | c) Salesperson and customer work together to set expectations and plans for next 12 months (business/purchase/support plan) | Objective Management, Time Management | • Linked to 3(b) to schedule follow-up activities |
| | d) Customer directly contacts the manufacturer regarding a product problem | Contact Management | • Associated with Contact Management which enables the salesperson to receive and share all information related to that customer's contact with the company - the system reacts to key events and series of events based on business rules to identify tasks |
| | e) Customer brings the product to the dealer for service. | Contact Management | • Associated with Contact Management which enables the salesperson to receive and share all information related to that customer's contact with the company - the system reacts to key events and series of events based on business rules to identify tasks |
| | f) Marketing materials are sent to customers that have purchased a particular product regarding an available upgrade | Contact Management, Product | • Linked to 5(a,b) and linked to 1(a) to identify Customer as a potential customer for upgrades for the product ordered and linked to 1(b) to automatically send out product upgrade mailing to the customer |
| 5. Order Management | a) Customer approves the proposal and signs the order | Order Management | • The system marks the sales step as complete (3f), recalculates the probability of closing the sale(3d, 7a) and prompts the salesperson to accept or confirm the schedule for the follow-up (3f). |
| | b) Salesperson creates and submits an order for a particular product for a customer | Order Management | • Linked to 1(a) to identify Customer as a potential customer for accessories for the product ordered and linked to 1(b) to automatically send out product accessories mailing to the customer |
| | c) Salesperson requests a change to an order already submitted | Order Management | • Linked to 2(c) to reference configuration requirements and 3(d, g) to re-forecast sales and commissions |

| Component | Event | Related Module | "Paired" Event - *System Intelligence* |
|---|---|---|---|
| 5. Order Management | d) Customer requests to know delivery date for product and salesperson investigates order status | Order Management | |
| 6. Training | a) Company's training department analyzes training requirements and develops training course and curriculum for product knowledge and skills improvement | Training | |
| | b) Sales manager analyzes training requirements, identifies available material and assigns a plan for training requirements to a salesperson | Sales Management, Training | • Linked to 7(a-e) to evaluate training needs of salesperson and assign training elements and linked to 3(objective management and time management() to communicate, plan, and schedule the training plan |
| | c) Salesperson reads/reviews training material | Training | |
| | d) Salesperson completes a certification test | Training | • Linked to 1 to mark the step or task as complete and to 2(all) to allow access to elements of the Time with Customer functionality that requires certification prior to use. |
| 7. Sales Management | a) A sales manager reviews a sales person's forecast and compiles totals | Sales Management - Forecasting | • System automatically notifies sales manager when sales persons' forecast falls behind goals |
| | b) A sales manager analyzes a salesperson's close ratio and other measurement criteria | Sales Management - Forecasting, Objective Management | |
| | c) Sales manager reviews best practices of successful sales personnel and communicates those practices to other sales persons | Objective Management | • Linked to 3(f) to assign the recommended steps as a part of the objective management process |
| | d) Sales manager sets sales and territory goals for sales personnel | Objective Management, Forecasting | • Linked to 3 to communicate requirements to salesperson |
| | e) Sales manager completes performance reviews of sales personnel by reviewing accomplishments, status, and sales. | Training, Objective Management | |

SALES FORCE AUTOMATION SYSTEM AND METHOD

RELATED APPLICATIONS

This application is a Continuation Application of U.S. application Ser. No. 12/412,455 filed Mar. 27, 2009, now U.S. Pat. No. 7,941,341 which is a Continuation Application of U.S. application Ser. No. 11/929,548, filed Oct. 30, 2007, entitled "Sales Force Automation and Method", now issued as U.S. Pat. No. 7,516,088 on Apr. 7, 2009, which is a Divisional Application of U.S. application Ser. No. 11/537,953, filed Oct. 2, 2006, entitled "Sales Force Automation System and Method", now abandoned, which is a Continuation Application of U.S. application Ser. No. 09/566,872, filed May 8, 2000, entitled "Computer-Readable Data Product for an Integrated Computerized Sales Force Automation System", now abandoned, which is a Continuation Application of U.S. application Ser. No. 08/550,089, filed Oct. 30, 1995, entitled "Integrated Computerized Sales Force Automation System", now issued as U.S. Pat. No. 6,067,525 on May 23, 2000. This application hereby incorporates in their entireties the disclosures of U.S. application Ser. No. 12/412,455, 11/929,548, U.S. application Ser. No. 11/537,953, U.S. application Ser. No. 09/566,872 and U.S. application Ser. No. 08/550,089.

FIELD OF THE INVENTION

The present invention is directed to a sales force automation system and, more particularly, to an automated sales system which facilitates the sale of an item or service by intelligently integrating into a single system tools used by a salesperson in the sales, process.

BACKGROUND OF THE INVENTION

Most conventional sales systems have been implemented in a limited manner and are typically directed solely to a particular event, task or small subset of tasks in the sales process. Such systems are constructed by examining a particular sales event and by developing an automated tool to assist the salesperson confronted by the particular event. Such systems are individually developed without regard for other events occurring in the overall sales process in which the salesperson is engaged. As a result, conventional systems fail to provide full support for the salesperson.

Conventional lead management systems have been developed, for example, to assist sales personnel in developing customer leads into potential customers. Such systems may use a letter library for producing mail merges to a list of leads. Such systems are developed for independent action and do not consider other events in the sales process. For example, no consideration is given to events occurring during the order management stage of the sales process where a purchased item or service purchased by the customer is actually being ordered, processed, built, manufactured, delivered, etc.

Using conventional systems, a salesperson may use the lead management system to prepare a mass mailing directed to specific types of customers having a particular need for a product. As a result of this mailing, a certain number of customers may be attracted to the salesperson's product. If one of these customers purchases the item from the salesperson, an order for the item must be generated and the salesperson must manage the order to insure proper delivery. Typically, a separately developed order processing package is used by the salesperson to generate the order. The order processing package does not take into consideration information which may have been generated or available in the system during the initial mass mailing stage of the process. Even within the order management phase of the sales process, different processing packages are often used to monitor the order process to ensure proper delivery is made.

Such conventional sales automation systems are often developed by separate vendors and, as described above, the vendors develop the systems in consideration of only that portion of the overall sales process in which the sales automation system is to be used. As a result, the different systems are oftentimes incompatible with one another. This leads to an inefficient overall process and in many instances requires redundant information to be stored in multiple locations for use by the various systems. The use of multiple, often incompatible, sales tools throughout the sales process increases the costs associated with making the sale and lessens the likelihood of making the sale by diminishing the impact of the sales presentation and by failing to effectively use all of the information available to the salesperson.

Conventional attempts to couple different sales tools together have also failed to appreciate the overall sales process. Such multiple task systems typically take different conventional sales tools and tie them into a single system. However, sales tools tied together in this manner still fail to appreciate the overall sales process and do not use valuable information obtained during the sales process as it is relevant to other phases of the sales process. Typically, the individual tools of such systems are developed in consideration of only the particular event in the sales process for which the tool will be used.

Like the individual systems, typical prior art multiple task sales tools are also developed without an appreciation for the complete sales process. Due to the lack of appreciation for the entire sales process, such conventional systems do not use much of the information made available to the system upon occurrence of an event in the sales process. For example, no consideration is given to how one event in the sales process relates to other tasks and events in the sales process. While a particular event occurring in one phase of the sales process may be relevant to tasks or events in another phase of the process, conventional systems have failed to recognize the significance of the event or to use the information consistently throughout the sales process.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later. In accordance with one embodiment of the present invention, a sales force automation system is used to generate a proposal in a sales process. The system includes a data component configured to store data developed and used in the sales process. This stored data may include data from a lead generation phase, time with customer phase, and purchase order management phase. The system also includes a communication component configured to support remote access communications with a back office system. A proposal software module is used to generate the proposal by retrieving data from the data component for the proposal. The software module is programmed to (i) tag features and benefits for the proposal, (ii) tag competitive information for the proposal, and (iii) create a customer solution. A management module is configured to detect a proposal generation and instruct a module in the back office system to update to reflect the proposal generation. The management module is configured to operate even when disconnected from the back office system such that data to instruct the module in the back office system to update is placed in the communication component and automatically transmitted at a next connected session with the back office system. In addition, a method is described for generating a proposal using the sales force automation system components.

In accordance with another embodiment of the invention a sales force automation system is used to submit a purchase order in a sales process. The system includes a data component configured to store order requirements information, configuration information from proposals, and customer information. The system also includes a communication component configured to support remote access communications with a back office system. An order management software module is used to submit a purchase order by retrieving data from the data component. The software module is programmed to (i) check purchase order requirements based on order requirements information from the data component, (ii) retrieve configuration information from a proposal, (iii) retrieve customer information, (iv) create a work session file used to manage information related to the purchase order. A management module is configured to detect a purchase order submittal process and instruct a module in a back office system to update a sales management forecast to reflect the purchase order submittal process. The management module is configured to operate even when disconnected from the back office system such that data to instruct the module in the back office system to update is placed in the communication component and automatically transmitted at a next connected session with the back office system. In addition, a method is described for submitting a purchase order using the sales force automation system components.

In accordance with another embodiment of the invention a sales force automation system is used to update price information in a sales process. The system includes a data component configured to store price data. The system also includes a communication component configured to support remote access communications with a back office system. A management module is configured to detect a price information update from the back office system and update the price data stored in the data component and mark old information as invalid in a configuration database of the data component. The management module is configured to operate even when disconnected from the back office system such that a price information update in the back office system is received in the communication component and automatically processed at a next connected session with the back office system. In addition, a method is described for updating price information using the sales force automation system components.

According to another aspect of the present invention, an automated sales system for facilitating a sale of an item or service by intelligently integrating into a single system tools used by a salesperson in a sales process is provided. The automated sales system can include a plurality of subsystems of a computer configured to electronically facilitate one or more actions performed during at least one phase of the sales process; and an event manager, electronically coupled to at least one subsystem of the plurality of subsystems, the event manager detecting one or more changes in information regarding an event occurring within the system and automatically initiating an operation in one or more particular subsystems of the computer to facilitate a new action based on the event, wherein at least one subsystem of the plurality of subsystems determines if the event has occurred previously in the sales process and updates another event or task in at least another subsystem of the plurality of subsystems if the operation is automatically initiated.

In accordance with one embodiment, the event occurs during an order management stage of the sales process.

In accordance with another embodiment, the event can include a purchased item or service purchased by a customer when it is actually being, at least one of, ordered, processed, built, manufactured or delivered.

Still in accordance with another embodiment, the system can further include a first memory storing a plurality of rules, each rule indicating at least one subsequent action to be taken by a subsystem of the sales system upon occurrence of a corresponding event occurring in a particular context; and a decision subsystem configured to identify a rule stored in the first memory corresponding to the event and for initiating the operation in the particular subsystem based on the identified rule.

Still in accordance with another embodiment, the plurality of subsystems can include a time with customer subsystem configured to convert a lead to a buying customer, so as to close a sale; and a lead generation subsystem configured to convert a name to a potential customer.

Still in accordance with another embodiment, the plurality of subsystems can include a time with customer subsystem configured to convert a lead to a buying customer, so as to close a sale; and an order management subsystem configured to convert the sale such that a product or service delivered matches a product or service sold.

Still in accordance with another embodiment, the plurality of subsystems can include a time with customer subsystem configured to convert a lead to a buying customer, so as to close a sale; and a customer retention subsystem configured to convert an existing customer into a lead, so as to generate repeat sales.

Still in accordance with another embodiment, the plurality of subsystems can include a time with customer subsystem configured to convert a lead to a buying customer and prompting the buying customer to make a buying decision, so as to close a sale; and a self management subsystem configured to assist a salesperson in managing sales information.

Still in accordance with another embodiment, the plurality of subsystems can include a time with customer subsystem configured to convert a lead to a buying customer, so as to close a sale; and a training subsystem configured to provide training to a salesperson.

Still in accordance with another embodiment, the plurality of subsystems can include a time with customer subsystem configured to convert a lead to a buying customer, so as to close a sale; and a sales management subsystem configured to assist a sales manager in managing a plurality of salespeople.

Still in accordance with another embodiment, the plurality of subsystems can include an order management subsystem configured to ensure that a product or service delivered matches a product or service sold; and a self management subsystem configured to assist a salesperson in managing sales information.

Still in accordance with another embodiment, the plurality of subsystems can include a lead management subsystem configured to manage a conversion of a lead to a prospect and of the prospect to a buying customer, and a self management subsystem configured to assist a salesperson in managing sales information.

In accordance with another aspect of the present invention, a method of facilitating a sales process of an item or service using a computer arrangement having a plurality of subsystems configured to facilitate one or more actions performed during at least one phase of the sales process is provided. The method can include providing the computer arrangement having one or more processors and the plurality of subsystems; electronically and automatically detecting one or more changes in information regarding an event occurring in the sales process using at least one subsystem of the plurality of subsystems; and electronically and automatically initiating an operation in one or more particular subsystems of the computer arrangement to facilitate a new action based on the event using at least one subsystem of the plurality of subsystems, wherein at least one subsystem of the plurality of the subsystems determines if the event has occurred previously in the sales process and updates another event or task in at least another subsystem of the plurality of subsystems if the operation is automatically initiated.

In accordance with one embodiment, the event occurs during an order management stage of the sales process.

Still in accordance with another embodiment, the event can include a purchased item or service purchased by a customer when it is actually ordered, processed, built, manufactured or delivered.

Still in accordance with another embodiment, the method can further include determining whether a prescribed event occurred in the sales process prior to the event; and indicating whether the prescribed event has previously occurred.

Still in accordance with another embodiment, the method can further include inferring the occurrence of an event while a salesperson is with a customer; and using at least one subsystem of the plurality of subsystems to facilitate an action taken while managing an order made by the customer.

Still in accordance with another embodiment, the method can further include inferring occurrence of an event while converting a name into a customer; and using at least one subsystem of the plurality of subsystems to facilitate an action taken while a salesperson is with the customer.

Still in accordance with another embodiment, the method can further include storing a plurality of rules in a memory, each rule indicating at least one subsequent action to be taken by a subsystem of the sales system upon occurrence of a corresponding event occurring in a particular context, identifying a rule corresponding to the inferred context; and initiating the operation in the particular subsystem based on the identified rule.

Still in accordance with another embodiment, the method can further include inferring occurrence of an event while converting a name to a potential customer; and using at least one subsystem of the plurality of subsystems to convert a lead to a customer.

Still in accordance with another embodiment, the method can further include inferring occurrence of an event while converting a lead to a buying customer; and using at least one subsystem of the plurality of subsystems to convert an existing customer into a lead, so as to generate repeat sales.

Still in accordance with another embodiment, the method can further include inferring occurrence of an event while converting a lead to a buying customer and prompting the buying customer to make a buying decision; and using at least one subsystem of the plurality of subsystems to assist a salesperson in managing sales information.

Still in accordance with another embodiment, the method can further include inferring occurrence of an event while converting a lead to a buying customer; and using at least one subsystem of the plurality of subsystems to provide training to a salesperson.

Still in accordance with another embodiment, the method can further include inferring occurrence of an event while converting a lead to a buying customer; and using at least one subsystem of the plurality of subsystems to assist a sales manager in managing a plurality of salespeople.

Still in accordance with another embodiment, the method can further include inferring occurrence of an event while ensuring that a product or service delivered matches a product or service sold; and using at least one subsystem of the plurality of subsystems to assist a salesperson in managing sales information.

Still in accordance with another embodiment, the method can further include inferring occurrence of an event while managing a conversion of a lead to a prospect and of the prospect to a buying customer; and using at least one subsystem of the plurality of subsystems to assist a salesperson in managing sales information.

In accordance with another aspect of the present invention, a computer implemented sales system used to facilitate a sales process of an item or service is provided. The system can include a plurality of subsystems configured to electronically facilitate actions performed during the sales process; and an event manager coupled to the subsystems and configured to detect one or more changes in information of an event occurring in the system, link the event with an action to be performed during the sales process based on prior sales experience using the sales system, and automatically initiate an operation using at least one subsystem of the plurality of subsystems to facilitate the action to be performed based on the inferred context, wherein at least one subsystem of the plurality of subsystems determines if the event has occurred previously in the sales process and updates another event or task in at least another subsystem of the plurality of subsystems if the operation is automatically initiated.

In accordance with one embodiment, the event manager can include an expert system.

Still in accordance with another embodiment, the event manager can include an expert system configured to automatically monitor events occurring in the sales process, identify which events lead to a desired outcome in a use of the sales system, and produce a knowledge database for use in subsequent operations as the prior sales experience using the sales system.

Still in accordance with another embodiment, the expert system can include a knowledge database configured to store information related to the prior sales experience using the sales system; a component configured to realize an implication of the information stored in the knowledge database; and a component configured to strategize a desirable subsequent action based on an implication of the information stored, wherein the operation automatically initiated by the event manager carries out the desirable subsequent action.

BRIEF DESCRIPTION OF THE DRAWINGS

The invention may be more completely understood in consideration of the following detailed description of various embodiments of the invention in connection with the accompanying drawings, in which:

FIGS. 15A-15C illustrate in table form an example of how data may be organized in the data component of FIG. 2;

FIG. 16 is a flow chart illustrating an operation of a system in accordance with an embodiment of the invention;

FIGS. 21A-21E illustrate a table of related events in a sales process;

DETAILED DESCRIPTION

The present system is a fully integrated sales automation system in which each aspect of the entire system is integrated with each other aspect of the entire system to intelligently form a complete sales tool. The preferred system is constructed such that relative information generated or available as a result of an event occurring in any portion of the overall system is automatically reflected and used in a maximally efficient manner by all other portions of the system to which the information is relevant.

Figure 1:
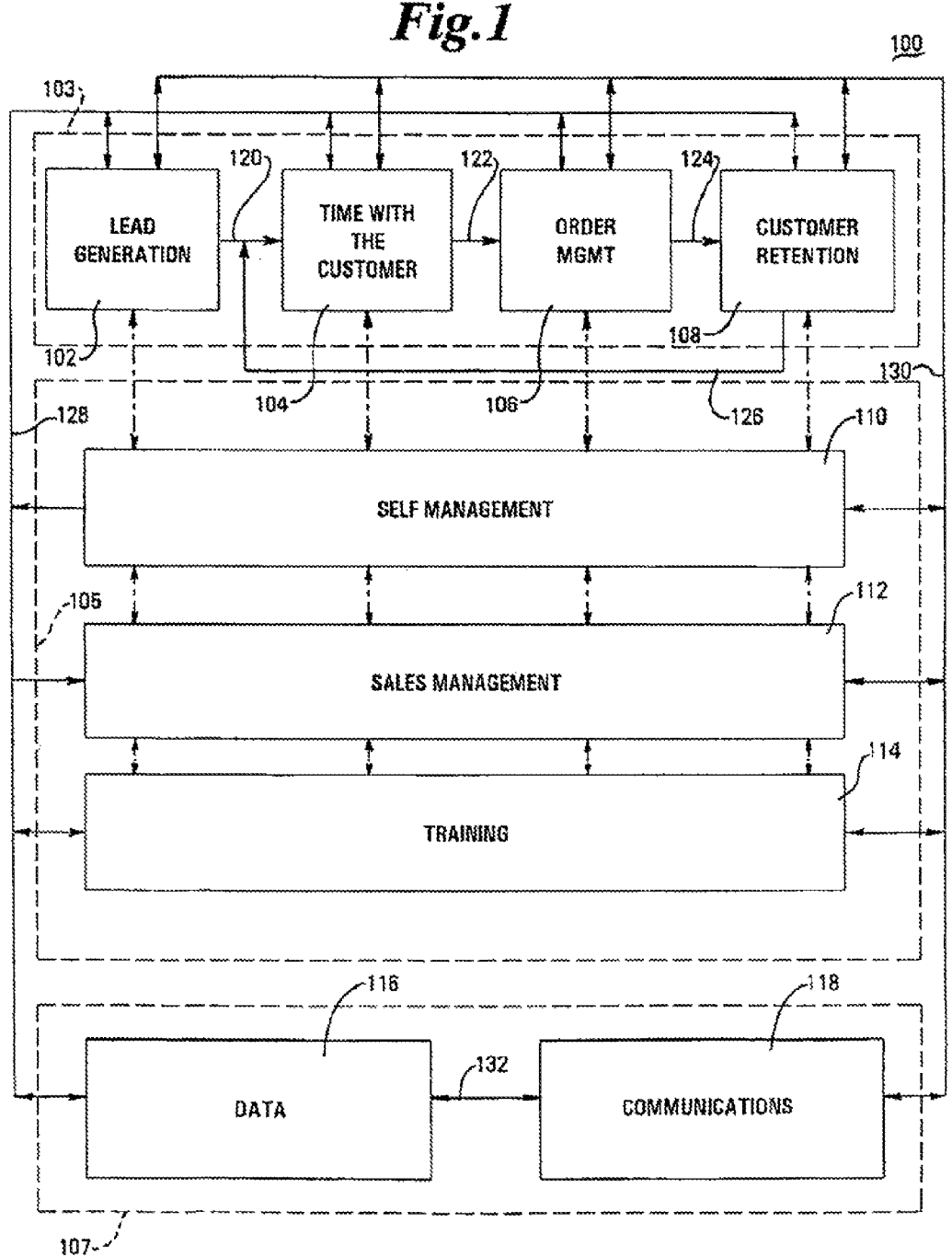
FIG. 1 is a conceptual diagram of various components of a sales automation system.

Exemplary components of a tool designed to support the complete sales process are illustrated in FIG. 1. A salesperson support system 100 is made up of a number of different subsystems which generally relate to various phases of the sales process. The system as disclosed is divided into four core process components 103, namely a Lead Generation component 102, a Time with Customer component 104, an Order Management component 106 and a Customer Retention component 108. Additional support components 105 may be integrated into the system to support the function and use of the core process components 103. For example, in the disclosed embodiment, three support process components 105 provide support for the core process components 103. Support process components 105 typically include a Self Management component 110, a Sales Management component 112 and a Training component 114. Two hardware or system components 107, namely Data component 116 and Communications component 118, are provided in the preferred system for use by the core process components 103 and support process components 105. Each of the core process components 103 relate generally to a particular phase of the overall sales process from initial generation of a name as a lead to retention of a satisfied customer for future sales. The support process components 105 relate generally to those tasks carried out by sales personnel throughout the entire sales process. The general functions and integration of the various components as implemented in the preferred embodiments are described more fully below.

The lead generation component 102 is provided to assist sales personnel to identify leads, to generate qualified leads and to begin the sales process. The lead generation component may include, for example, automated systems designed to assist the sales personnel in carrying out such tasks as telemarketing, kiosk presentations, trade show demonstrations, database marketing, electronic advertising, etc. Data developed and used during the lead generation phase of the sales process is stored in and retrieved from a database in the data component 116. For example, a kiosk may be set up at a trade show through which information such as names, addresses, and product interests of potential customers is gathered. This information is stored in a database of the data component 116 of the system and is made available for use by other components of the system. Sales information currently available in a database, such as information previously gathered, purchased databases, or previous customers, may also be used in conjunction with the lead generation component to identify potential customers. For example, such information may be used to generate an electronic mailing to potential leads. Such a process can be fully automated in accordance with parameters set by the salesperson using the system.

The lead generation component 102 is intelligently integrated with the other components of the system to provide a complete system. As described more fully below, the intelligent integration of the lead generation component 102 with the rest of the system operates to recognize events occurring in the system which are relevant to functions of the lead generation component 102 and may automatically implement such functions as appropriate.

The second core process component of the salesperson support system 100 is the time with customer component 104. This component is used by the salesperson during the phase of the sales process which occurs from the time a qualified lead is identified to the time a sale is completed and an order is created. The time with customer component 104 is, in many respects, the heart of the system 100, since it is used by the salesperson at a time in the sales process where maximum payback is received. During this phase of the process, the system 100 assists salespeople in generating revenue by committing a customer to a specific purchase, i.e., converting the "lead" into a purchasing customer.

The time with customer component 104 may include a number of subcomponent modules each automated to assist sales personnel in efficiently performing their function during this important phase of the sales process. For example, presentation and proposal modules assist the sales personnel to electronically give a presentation to a customer and prepare a proposal for the customer which reflects the presentation. Integration of these modules with other components and modules of the system provides for efficient generation of presentation and proposals which are tailored to the needs and preferences of the customer. As described more fully below, the preferred system also intelligently recognizes significant events occurring during the time with customer phase of the sales process and informs other components of the system when the recognized event indicates other action should be taken.

Customer requirements modules, configuration modules, features and benefits modules, performance modules, quotation and financing modules, life cycle modules, services modules, comparative presentation modules, goods, etc., provide assistance to sales personnel making the maximum amount of information regarding a potential product or service available to the potential customer in order to successfully complete the sales process. In a preferred system, all such modules are integrated with each other as well as with the other components, to permit an efficient exchange and use of information.

As conceptually illustrated in FIG. 1, the time with customer component 104 receives necessary information, for example, pricing and financing data from the data component, and stores information obtained during the time spent with the customer, such as the customer's particular needs and desires in the databases of the data component 116.

The order management component 106 assists sales, personnel in efficiently managing the critical sales process phase that encompasses the time between the purchase decision and the time the product or service is delivered. For some products or services, this could be a short period of time, while for others it may be many months or even years. The order management component 106 allows the sales personnel to electronically manage changes and provide needed information to the customer during this critical time. Moreover, by integrating the order management component 106 with the time with customer component 104, the actual order can be directly created from the proposal information. Furthermore in the preferred system, any information related to the customer's specific needs or desires gleaned from the customer during the time with the customer phase of the sales process may be used by the order management component 106 to ensure the needs and desires are met. For example, if a change order is processed, the changes may be automatically checked to evaluate their impact on any other needs of the customer.

The order management component 106 may include, for example, subcomponent modules such as change order modules, order status modules, invoicing modules, order acknowledgment modules, etc. Each of the modules assists the sales personnel to electronically manage the order process. The order management component 106 is also coupled to the data component 116 so that change order information, for example, will be automatically reflected in the one or more databases of data component 116. In the preferred system, the order management component 106 is intelligently integrated with the other components of the system to recognize events occurring in the order management phase of the sales process.

A further core process component of preferred system 100 is the customer retention component 108. This component assists sales personnel during the phase of the sales process after delivery of the service or product purchased by the customer. Component 100 assists sales personnel in retaining a customer. This is accomplished through processes that ensure a customer remains satisfied with the purchase decision and that increases repeat sales opportunities. For example, in FIG. 1, the customer retention component 108 is shown as feeding back information via line 126 to line 120 connecting the lead generation component 102 and the time with customer component 104. This diagrammatically illustrates an integration between the customer retention component 108 as it is used to convert and satisfy the customer into a new potential customer. It is understood that the function of certain modules of the customer retention component 108 and the lead generation component 102 may overlap.

The customer retention component 108 is also connected to store and retrieve data using the one or more databases of the data component 116. The customer retention component 108 may include, for example, customer contact modules, newsletter modules, customer satisfaction modules, after sales incentive modules, customer business plan modules, promotion modules, etc., to facilitate its function of converting satisfied customers into repeat customers. As with the other components, the customer retention component is intelligently integrated into the preferred system.

The support process components 105 are provided to assist the sales personnel in more efficiently utilizing the core process components 103 and in carrying out the tasks associated with the various phases of the sales process in an intelligently automated manner. The self management component 110 assists sales personnel to manage their opportunities, time, contacts, schedules, goals, tasks, etc. This component is used by the salesperson as a support for each of the core process components 103. By way of example, the sales management component 110, may be intelligently integrated into the system to monitor for certain types of events occurring in the other system components, and, when such an event occurs in one component, for example, the time with customer component 104, an automatic to-do list is automatically generated in the self management component 110. The to-do list represents actions which will need to be carried out as a result of the event using other components of the system such as the order management component 106. Thus, the self management component 110 both assists the sales personnel in utilizing the core process components of the salesperson support system 100 and provides for increased integration of the complete system.

The sales management component 112 supports the sales process by allowing sales managers access to current information from salespeople for which they have managing responsibilities. The sales management component 112 may be implemented using client-server technology to allow sales managers to electronically manage sales activities including coaching, planning and forecasting, even when sales personnel are away from the main office. As with the self management component 110, the sales management component 112 may be intelligently integrated to interact with each of the other components of the system. With such an implementation, key sales events are recognized by the system, and the sales management component 112 automatically implements management tasks on the basis of these events.

A training component 114 facilitates the sales process by electronically providing training activities. In the preferred system, the training component 114 is integrated with the entire system such that salespeople are trained on product knowledge, sales skills, and the system usage using computer-based training, without spending valuable time away from their sales territory. Moreover, integration of training component 114 with the core processing components 103, as well as the self management component 110 and the sales management component 112, facilitates automated training exercises on how to effectively use of each of these components. By integrating training component 114 with the data component 116, training opportunities may be implemented using real information. For example, if sales personnel are being trained to prepare customer proposals and orders, actual up-to-date information and product descriptions can be used to ensure that the training process accurately reflects the actual sales process.

The preferred system also recognizes sales events which are significant to training and may automatically initiate certain training functions on the basis of these training events.

Preferred data component 116 is an integral component of the salesperson support system 100. Each of the above-described components are driven in some respect by data and information, such as prices, specifications, competition, features and benefits, leads, names, financing, sales programs, etc. The data component 116 provides for data management, synchronization, storage, and distribution, all of which are key to a fully integrated salesforce automation system.

The communications component 118 also supports each of the above-described components. This component may include, for example, electronic data and software distribution using client-server, messaging, diskette and CD-ROM technology. In many sales industries, the sales personnel are widely distributed over large geographic territories. In such systems, the communication component includes capabilities to support remote access communications including cellular networks and satellite communications. If the various components are implemented on different platforms, communication between the platforms must also be handled. It is noted that each of the components and associated modules can be configured to operate in a multinational environment to facilitate sales in various countries.

The above-described components can provide support for the complete sales process. However, each of the above-described components may not be needed in a particular sales environment. Thus, various subset combinations of the sales system can be constructed depending on the functionality requirements of the product or service to be sold. What is particularly advantageous, however, is that each of the components used in a particular sales system be fully integrated into a system which allows for a common exchange of relevant information between the various components used. The salesperson support system 100 may be constructed using a foundation system, described more fully below, to which the various components can be loosely coupled, as "pluggable" modules, to form a customized integrated sales system.

Figure 2:
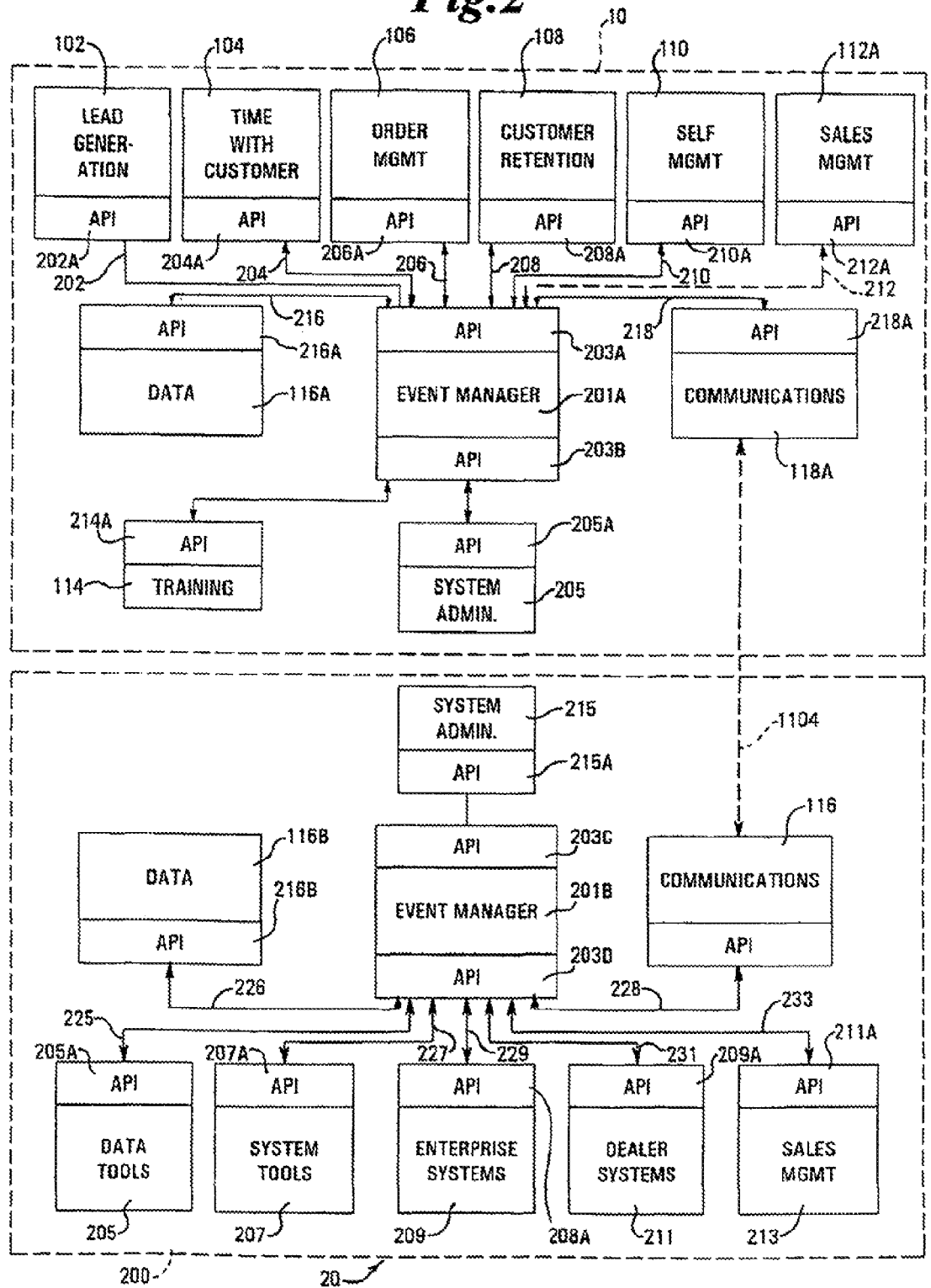
FIG. 2 illustrates a sales automation system in accordance with an embodiment of the invention.

A complete salesforce automation system 20, as an exemplary embodiment of a preferred system, is illustrated in FIG. 2. In FIG. 2, the salesperson support system 100 includes the above-described components, with slight modifications described below. FIG. 2 also illustrates a server-based back office system 200, which provides support for the salesperson support system 100 and includes a number of additional functions. As described below, the back office system 200 may be used by data maintenance and system administration personnel to facilitate the overall sales process by providing complete electronic support for salespeople using the salesperson support system 100. Preferred system 20 integrates one or more of distributed system technology, object-oriented architecture, multimedia presentation technology and workgroup/workflow automation capabilities to provide a fully integrated computerized salesforce automation system. System 20 may be implemented using distributed technology, which enables salespeople to work using the salesperson support system 100 while disconnected from the back office system 200. In this manner, a salesperson is able to complete sales activities in any location at any time. A distributed technology implementation is particularly advantageous in sales industries where a number of salespeople are located at diverse geographic areas but require a significant amount of sales information to facilitate an effective sales presentation and complete the sale. Such a system preferably integrates all of the tools needed by the salesperson for the time spent with the customer as well as time away from the customer. The system further may be integrated with e-mail and facsimile capabilities to provide a complete automated sales tool.

As illustrated in FIG. 2, each of the various components of the salesperson support system 100 is communicatively coupled to an event manager 201A via respective lines 202, 204, 206, 210, 212 and 214. The various components of the salesperson support system 100 communicate with the event manager using respective application programming interfaces (APIs). The event manager 201A intelligently controls the flow of data and other information through the system. For example, data required by or input through one of the components will be handled by the event manager to retrieve or store the data from and to a database of the data component 116A.

As described more fully below, the event manager 201A provides intelligent integration of the components of the system. The event manager 201A recognizes events occurring in the system and determines, on the basis of the event and the context in which the event occurs, if any other actions or operations should be carried out by the system. If actions are necessary, the event manager 201A notifies the appropriate component of the needed action, grants the component access to any needed data or other information and instructs the component to carry out the operation.

Certain types of data are typically made available to the various components in various forms. For example one component may have rights to alter data stored in a local storage area of the data component. Other components may be granted limited access to view such data but will not be allowed to alter the data. The event manager 201A also controls access to the data and oversees the transfer of information between the various components.

The event manager 201A also recognizes when a particular operation in one component requires a component in different module and handles the communication between the two components. The intelligent integration of the various components and modules of the system under operation of the event manager is described more fully below.

The salesperson support system 100 also includes a system administration subsystem 205 connected to the event manager 201A. This subsystem includes a tool box manager for handling administrative functions such as setting user passwords, managing default settings, performing update processes, etc.

As illustrated in FIG. 2, the data component 116 (FIG. 1) is comprised of a data component 116A directly supporting the salesperson support system 100 and a data component 116B supporting the operations and functions implemented in the back office system 200. As described more fully below, each of the data components 116A and 116B includes one or more databases holding sales related information. Further, some data may be stored in both systems in order to maximize the efficient operation of the system.

Portions of the communications component 118 (FIG. 1) also reside in both the salesperson support system 100 and the back office support system 200. Communications component 118A located in the salesperson support system 100 is communicatively coupled to the communication component 118B of the back office system 200. The particular type of communicative coupling between the salesperson support system 100 and the back office support system 200 will depend on the physical proximity of the two systems.

The communications component 118B of the back office system 200 is linked to the event manager 201B. The event manager 201B handles information processed in the back office system 200. The event manager 201B intelligently integrates the various components of the back office system 200. The event managers 201A and 201B perform similar operations for their respective systems. Sales information is exchanged between the two systems as needed using the communications components 118A and 118B.

The back office system 200 includes a number of subsystems designed to further facilitate and support the sales process. A system administration subsystem 215 is provided to administer the back office system 200. This subsystem allows a system administrator to manage the administration of users and the system. The subsystem includes tools to define names, addresses, security rules, passwords, version control, geography, etc. The system administration subsystem 215 is also used to handle distribution of data updates, functional updates as well as version creation and management of the overall system 20. A report manager tool is also provided in the system administration subsystem 215 to handle audit reports, data books and other documents.

A data tools subsystem 205 is provided in the back office system 200. As described more fully below, the data tools subsystem 205 is used to edit and maintain data within the system. The data tools subsystem 205 may be integrated into the functionality of the various sales system components. In such a system users having access rights granted may gain access to the data tools subsystem of the system.

A system tools subsystem 207 is provided to facilitate the creation and management of reports and templates, screen terminology and system default values. An enterprise systems subsystem 209 is provided to manage enterprise information. The back office system 200 may also include a dealer business subsystem 211 which includes a data manager for handling dealer inventory, customer data, credit approval, service records, purchase histories, etc.

As illustrated in FIG. 2, the sales management component 112 (FIG. 1) may be provided in both the salesperson support system 100 (sales management component 112A) and the back office system 200 (sales management component 112B). Depending upon the particular sales industry, sales managers may be located at the home office or may be mobile. When the sales manager is located at the home office, principal functions of the sales management component 112 (FIG. 1) reside in the sales management component 112B and the sales management component 112A contains the necessary support functions to facilitate electronic management of the salesperson using the salesperson support system 100. When the sales manager is located away from the home office, the sales manager can use the sales management component 112A to access the sales management component 112B and perform managing duties. As needed, the functions of the sales management operations may be provided in the system 100 used by the remotely located sales management personnel.

The various components and subsystems illustrated in FIG. 2 may be implemented as software modules executing on general purpose computers. Alternatively, separate processors or computing platforms may be used for each component of the system or for various combinations of components. When, for example, the salesperson support system 100 is detached from the back office system 200, separate processor elements must be used by the systems. However, a single processor, such as a mini-mainframe connected to a number of individual terminals can be used when the salespeople are all located in a close proximity. For example, a number of automobile salespeople may be located a single dealership, each having their own terminal to support their sales activities.

It is noted that system 20 is particularly adaptable for use by sales personnel who must travel over wide geographic areas. A portable computer may be used to implement the salesperson support system 100, which has full functionality when detached from the back office system 200. The portable computer may be communicatively coupled, via the communications subcomponents 118A and 118B, to the back office system 200 as needed to update data and exchange sales information. In this manner, the system 20 provides complete automated support for the entire sales process even while traveling away from the home office. The salesperson may travel to the customers' facilities where he can utilize up-to-date prices and availability, deliver presentations and generate proposals in a highly automated and efficient manner. This greatly increases the salesperson's opportunity for closing a sale with the customer. In addition, since each sales event in the sales process uses the system, the system can recognize the occurrence of the events and initiate any further action dictated by the event.

The operation of the various components of the system will be better understood by reference to the following exemplary embodiment. It is noted, however, that the subcomponent modules and features described below in connection with the various components may alternatively be provided in other components of the system or in more than one component. The description is provided to demonstrate how the various components are integrated into a complete salesforce automation system. It is also noted that the system can be used to sell any kind of service or product. For ease of illustration, specific examples related to the use of the system in selling motor vehicles are used. The concepts disclosed herein, however, can be implemented in other types of sales processes without departing from the invention.

Figure 3:
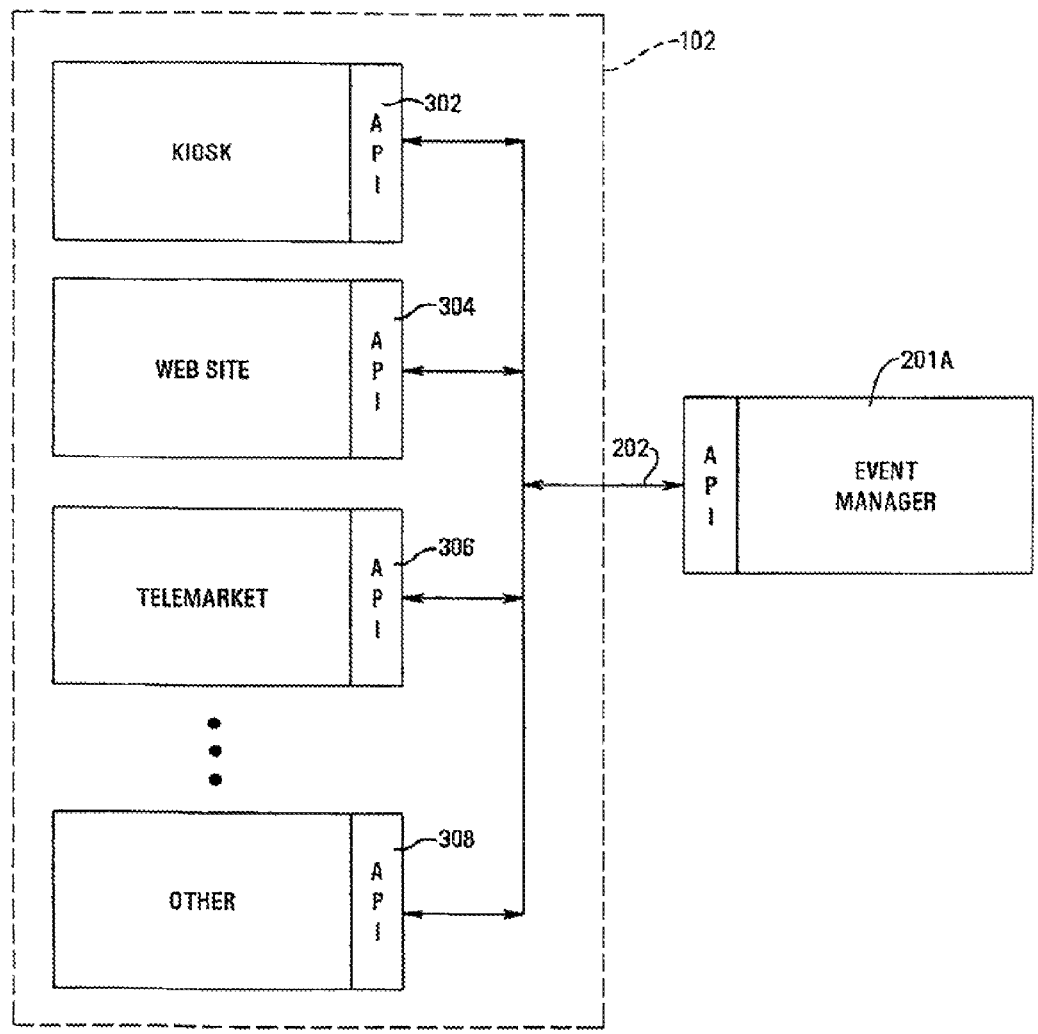
FIG. 3 illustrates an embodiment of a lead generation component of the system of FIG. 2.

FIG. 3 illustrates the subcomponent modules of the lead generation component 102. As illustrated in FIG. 3, the lead generation component 102 may include a kiosk module 302, a Web site module 304, a telemarketing module 306, etc.

As illustrated, the kiosk module 302 may include a stand-alone kiosk station operating pursuant to kiosk software interfaced through the event manager to the rest of the system 101 to receive data regarding potential customers. This data is then commonly available to the other components of the system and their respective subcomponent modules. Alternative to a stand-alone station, the portable computer of the salesperson can be used as part of a kiosk type interface with potential customers. Such a kiosk interface could be set up in locations where potential customers might be found.

The lead generation component 102 is directed primarily to pre-sales activities and includes a number of modules that may be installed at various sites for the purpose of providing sales information with or without a salesperson present. These modules facilitate the connection of lead information that can be provided to the appropriate salesperson. Remote sites include trade shows, kiosks, Internet Web sites, or electronic advertising. The lead generation component 102 is highly integrated with the time with customer component 104 and the self management component 110. All three of these components share a common functionality and are utilized to disseminate the higher quality leads from the lead qualification process.

The lead generation component 102 also includes the ability to process and/or receive lead data from other enterprise systems such as telemarketing, telesales or customer service records.

As illustrated in FIG. 2, the lead generation component 102 is integrated with the other components of the system via the event manager 201A. The intelligent operation of the event manager 201A allows information and interests provided to the lead generation component 102 by a prospective customer to be transferred to the other components of the salesperson system for action or follow-up. Similarly, information developed using other components, for example, the time with customer component 104, can be reused by the lead generation component to generate additional leads. The event manager 201A may intelligently recognize an event occurring while the salesperson is using the time with customer component 104, which suggests that the particular customer may be prospective lead for another type of service or product. This information can be transferred to the lead generation component 102 so that the prospective lead can be used for further action by the salesperson when using the lead generation component 102.

The kiosk module 302, illustrated in FIG. 3, is utilized at public forums where the salesperson may not necessarily be present. An interactive format is provided, most commonly with touch-screen interface, to generate interest by the prospective customer and collect customer information. The kiosk module 302 may run disconnected from any remote data source or may be implemented in real-time utilizing two-way data sharing across a network communications provider.

The Web site module 304 may utilize much of the same functionality and interface used by the salesperson when using the time with customer component 104 (described more fully below). The Web site component 304, while providing an interactive information supply to the Web site user, collects information about the user which is provided to the salesperson in the form of a lead. The lead information provided to the salesperson may include a profile of the product or service selected by the prospective, customer (lead) for follow-up sales activity by the salesperson.

A telemarketing module 306 is provided to integrate the system with enterprise telemarketing functionality. Data received through the enterprise telemarketing functionality is recognized by the event manager 201A and is provided directly to the salesperson via the self management component 110.

Figure 4:
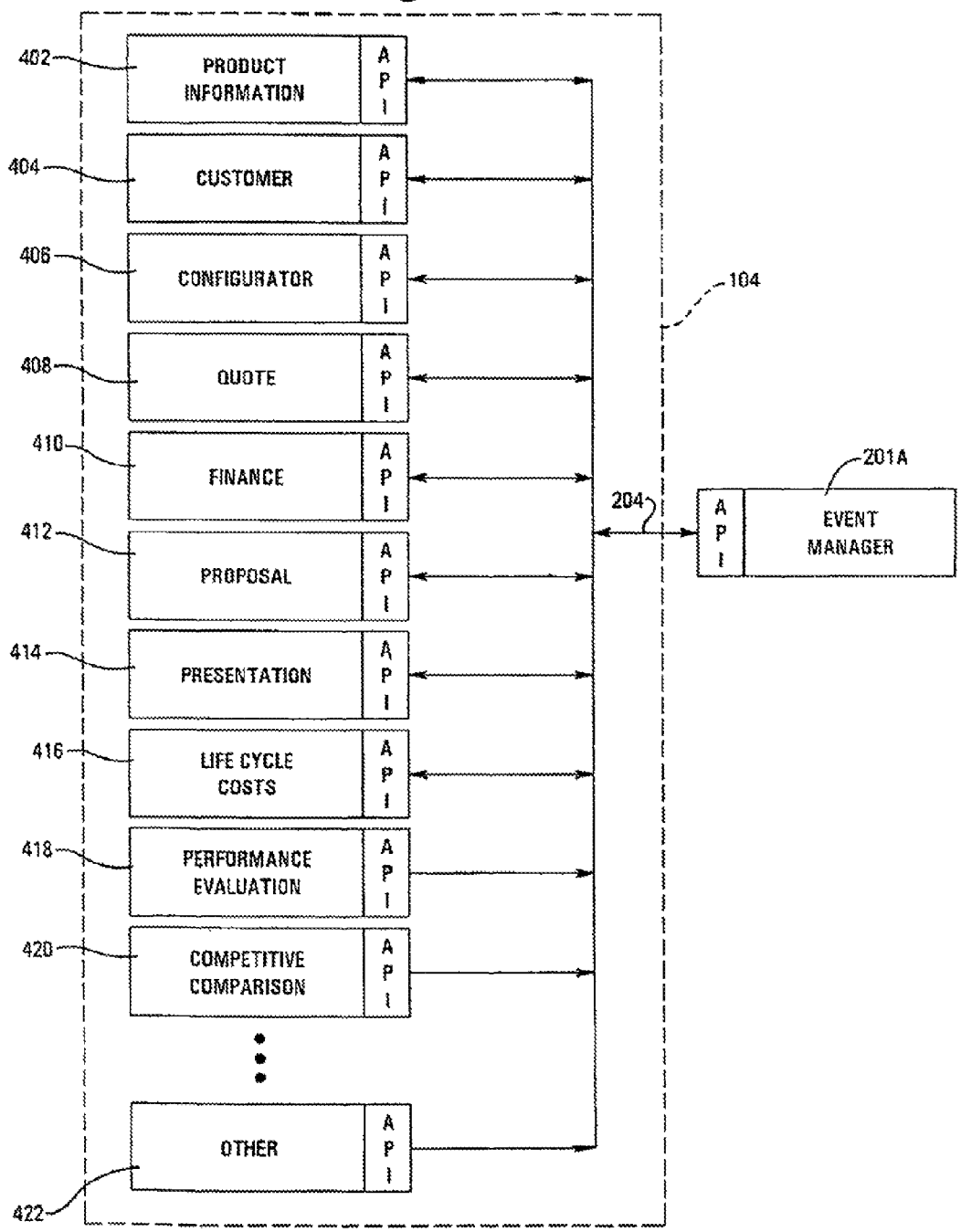
FIG. 4 illustrates an embodiment of a time with customer component of the system of FIG. 2.

FIG. 4 illustrates the subcomponent modules of the time with customer component 104. The subcomponent modules include a product information module 402, a customer requirements module 404, a configuration module 406, a quote preparation module 408, a finance module 410, a proposal generation module 412, a presentation module 414, a life cycle module 416, a performance evaluation module 418, and a competitive comparison module 420, among other modules. Each of these subcomponent modules are designed to assist the salesperson in maximizing time spent meeting with the customer to lead the customer to a purchase. It is noted that certain of the modules may be combined into a single module. For example, the competitive comparison module 420 may be incorporated into the product information module 402 such that competitive comparisons can be provided with descriptions of the product.

As described above, the time with customer component 104 is used by salespeople when they are with a customer or preparing a proposal or presentation for a customer in order to generate a sale of the product or service. The integrated subcomponent modules facilitate interaction between the salesperson and the customer through the sales process to develop specific solutions that meet the customer's needs, thereby enabling the salesperson to close the sale as described below.

The product module 402 is designed to present a variety of product information to the customer using a combination of text, graphic illustrations, motion, video, and sound. The product module 402 allows the user (i.e., salesperson) to present product, manufacturer, competitive comparison, dealership, and salesperson information to the customer. The product information may be set up in a table-of-contents format including paging and search functionality to facilitate the retrieval of product information for display to the customer. The product information module 402 may include a number of viewers, engines and communications modules. The viewers may include a text view, graphics illustration view, a motion view, and a video and sound view. A product information engine may be provided. In the communications portion of the product module 402, communication with other portions of the system is provided. The product information module 402 allows an interactive presentation for display of product information to the potential customer rather than a fixed sequential series of slides. The module presents information formatted in graphical features and benefits styles.

The product module 402, when incorporating the competitive comparison module 420, also provides the ability to present the company's product information side-by-side with a competitor's product information. The module supports various states including graphic states (e.g. still, animation, movies, sound, white papers, etc.) and has the capability of importing selected standard graphic formats (e.g. BMP, PCX, etc.) as well as using selective presentation software output (e.g. PowerPoint, Freelance, etc.). The product information module 402 also includes the capability of merging the specifications of a selected unit into either pre-defined formats or user-defined formats to facilitate bid specification creation. It also provides access to dealer information and salesperson information during this phase of the sales process.

The product module 402 is integrated to the rest of the system via the event manager 201A and includes the capability of exporting a sample of any information to the proposal module 412 and/or presentation module 414 for use as described fully below. The information generated may be tagged using the product module 402 and automatically inserted as a section of a proposal generated using the proposal module 412.

The product module 402 may also be provided with the ability to print any of the information presented, export text-based information to a text file format and graphic-based information to a graphic file format for use by word processing software and graphic editing software, respectively. Fax, modem and e-mail functions are built into the module to communicate the generated information between the customer and the salesperson.

The customer module 404 is used by the salesperson to facilitate gathering of customer-specific information that is used throughout the sales system, for example, in printed material and on order creation templates. Depending upon the specific industry in which the customer module 404 is designed for use, the information may include data such as the customer's current units, required performance standards, account type or family, as well as the standard information including names, addresses, phone numbers, etc. The customer module 404 also allows the user to enter free-form notes related to a particular customer's needs, proposal or presentation. The customer module 404 is integrated with the rest of the system via the event manager 201A for a common exchange of information. For example, data from the self-management component 112 of the system can be used to populate the customer information from the self-management component 112.

The customer module 404 typically includes reporting capabilities to print the customer information collected which can also be tagged and printed as a section of a proposal generated using the proposal module 412. The customer module 404 may also be programmed with customized API integration capabilities to allow the system to be used with contact management programs developed by other vendors, e.g., ACT! or Gold Mine. As with the other components and modules, the event manager recognizes events in the sales process, evaluates the events and initials appropriate action.

The configuration module 406 is comprised of multiple engines, APIs and various other subcomponents, each optimized for a particular portion of the configuration process. The configuration module 406 is supported by a data manager and editor provided in the data tools subsystem of the back office system 200 (described more fully below). The configuration module 406 receives data from a compiled run time version database located in data component 116A. The run-time version database is built from an open-product knowledge database located in the data component 116B while the two systems are connected. The salesperson uses the configuration module 406 to accurately configure and price a product that passes engineering, manufacturing and customer requirements. As with the other modules, the results can be tagged and automatically included in a proposal, presentation, and/or order submitted to the factory.

The configuration module 406 may be implemented on a portable computer allowing the salesperson to configure product or service information at any time or place, even while disconnected from the back office system 200. The configuration module 406 is interactive, checking for option and pricing relationships and updating unit status after each selection. In this manner, the unit being configured is accurate at all points during the sales process. Using the construction described herein, very short response times to support operations are provided when the salesperson is with the customer. Such a system may perform all option and pricing checks within one to three seconds after a selection is made.

As noted above, the configuration module 406 may be built around a small, secure, encrypted run-time database. A typical configuration database of the data component 116A (without images) will be approximately one to two MB (assuming 5,000 options with 20 million configuration possibilities). The configuration module 406 may also be used to provide simulated performance results based on the configuration selected. Sales functions such as inventory locators and supplier inserts (information provided by third party manufacturer suppliers) may also be integrated into the module to support the sales process.

Once a product is configured, the configuration module 406 may be used to carry out performance simulations for the product to determine if the product meets the customer's needs or desires. For example, the configuration module 406 may be used to configure a truck for a customer. Once the truck is configured a performance simulation may be carried out to determine if the configured truck meets customer's needs. The customer may need the truck to be able to haul a certain size load up a particular grade at a specified speed. The configuration module 406 will simulate the performance characteristics for the configured truck to see if it meets this criterion.

The quotation module 408 facilitates calculation and preparation of a bottom line quotation, thus enabling the salesperson to provide the customers immediate and accurate quotes for one or more units. Unit price, quantity, trade-in value, discounts, fees, and taxes are all taken into consideration in order to present an accurate and consistent quote. The quotation module 408 may include quotation module worksheet that is able to calculate a quote price based on profitability requirements.

The quotation module 408 automatically provides defaults, parameters and tax formulas, which can be established using a tool box in the system administration subsystem 205, to prompt for specific information required to accurately and consistently calculate a quotation. The quotation module 408 is integrated to the configuration module 406 to allow the salesperson to quote a unit specified in the configuration module 406 if desired. The quotation module 408 is also fully integrated with the rest of the system to allow the salesperson to apply purchase incentive programs and discounts on a fixed dollar or percentage basis. Fees can be added to the quote on a fixed dollar or percentage basis from a list established using the tool box of the system administration subsystem 205 or added uniquely to the particular quotation.

The quotation module may also be provided with the ability to include trade-in information entered by the user. Alternatively, a separate trade-in module may be provided in the time with customer component 104 to directly assist the salesperson in gathering information regarding a unit the customer wishes to trade-in. The information collected may include any necessary repairs or reconditioning required to bring the unit to a saleable condition, lien holder information and an evaluation process. Using such information, an accurate value for the trade-in can be automatically generated. Depending upon the specific industry, a variety of forms and reports can be made available and printed to assist with this process.

The quotation module 408 also provides utilities for calculating tax formulas as a percentage of unit price, percentage of unit less trade-in (allowance or net), or a flat amount. Specific various dollar ranges for the tax can also be applied (e.g. 1 k on zero dollars to $15,000, 10% on $15,001 to $30,000, etc.). The quotation module 408 may also include profitability worksheets to facilitate the calculation of effects of miscellaneous costs on the bottom line. The parameters for the worksheet can be set using the system administration tool box. Profitability functionality may be used to determine a price based on desired profit percentage, unit costs or flat product amounts.

As with the other modules, the quote module 408 is intelligently integrated to the rest of the system via the event manager 201A. The event manager may recognize that a firm quote has been given to a potential customer using the quote module 408. In an environment where product quantities are limited, the event manager may notify the back office system which in turn may automatically generate an order to increase the inventory on hand. Such an intelligent operation may be further enhanced using knowledge of how many firm quotes result in actual purchases. For example, the system may monitor the quote module 408 and order extra inventory every third quote when experience has indicated that one out of three quotes results in an order.

The finance module 410 may be comprised of multiple engines provided to assist the salesperson in quickly calculating and presenting finance and lease alternatives to customers based on information collected from other modules. The finance module 410 may include the ability to select from preset plans, calculate and customize plans, compare various plans, solve for financial goals, and print reports and forms. The finance module 410 can be used to generate a plan consisting of three groups of data reflecting: (1) values that accumulate in the amount financed; (2) financial parameters; and (3) a payment schedule which is generated using a payment calculation engine.

Various financing plans can be generated by corporate personnel using the back office system 200 and distributed to salespeople during connect sessions with the salesperson support system 100. Alternatively, plans may be created by the salesperson using the tool box. Defaults and limitations can also be controlled at either level. The finance module 410 provides the ability to apply business rules desired by the company to the proposed financing options presented by the salesperson. Again, the financing module 410 is fully integrated to the system such that presentations and proposals as well as order management and customer retention tasks are integrated with the finance options selected.

The finance module 410 may be used to assist the salesperson to edit the amount financed variables including price, net trade value, cash down requirements, insurance fees etc. The salesperson may also be able to edit finance parameter variables such as interest rates, payment schedule dates, payment frequency, payment method, terms and options. The various payment method alternatives include standard, irregular, blended rate, variable rate, skip, accelerated, step rent, and fixed principal.

The finance module 410 also assists the salesperson in providing leasing information to the customer. The system allows the salesperson to edit the amount leased variables including capitalized costs, acquisition fees, insurance fees, lease rates, payment factors, payment schedules, payment methods, security deposits, and taxes and fees to present various lease options.

A payment calculation engine is used by the finance module 410 to utilize information provided by the plans and return a payment scheduled based on the actuarial general equation. A plan analysis engine is used to calculate and evaluate various characteristics of a plan such as amortization, payment goals, net present value, internal rate of return and finance income. The finance module 410 also allows the salesperson to display simultaneous comparisons of various plans of any type and key elements of the plans or print the information in a report. A fit your budget engine can also be provided in the finance module 410 which qualifies a customers purchase price range, monthly payment range or cash down requirements. The information entered-using the finance module 410 is fully integrated to the other components and modules in the system. For example, selected financing options may be incorporated into a proposal generated using the proposal module 412.

A life cycle cost module 416 is provided to prepare a comprehensive analysis of the cost associated with utilizing a product over a time period. The analysis may include a comparison to an existing product, competitor's product, or the same product financed differently. The product analysis may incorporate both fixed and variable costs to demonstrate to the customer the overall impact of a purchase decision including owning costs, operating costs, maintenance costs and depreciation. Graphic presentations of the results may be generated to display side-by-side competitive analysis of cash flow and annual savings. As with the other modules, this module is fully integrated to the rest of the system for intelligent interaction via the event manager 201A.

The presentation module 414 and proposal module 412 provide a similar function of effectively presenting a solution to the customers needs. The presentation module 414 assists the salesperson in converting the proposed solution to the customers needs into an effective presentation for use while with the customer. Even the most effective customer solutions will not be sold unless properly presented to the customer. The presentation module 414 provides highly automated presentation generation which draws upon information obtained from other modules and components of the system. The module is designed to allow the user to specify, organize and create a high quality, interactive presentation based on the information collected from the customer, canned information about the product or service offered, as well as any other information which the salesperson imports into the sales system. Pre-defined templates are provided to facilitate the format of the buyer specific contents. Editing capabilities can also be provided for sections of the presentation to enhance flexibility.

The presentation module 414 is preferably implemented using easy to use user interface, such as a drag and drop interface, for selection of presentation sections and sequences. This eliminates cut and paste tasks by the salesperson. Because the information is generated by the fully integrated system, automatic preparation of presentations can be implemented without any modification of the data previously entered. The system may utilize all media formats including text, graphical images, video and sound to provide the presentation. The presentation is preferably provided interactively and non-sequentially to allow the salesperson to move from one topic to another as desired and dictated by the customer's needs. Predefined as well as user-defined presentation templates can be easily created to build consistent presentation formats based on buyer type, product or any specific selling situation. The complete presentation may be previewed and edited on screen. The overall system is controlled by a system administrator using the back office system 200. As described above, the material content for the presentation is automatically created on the basis of information collectable while the salesperson is interacting with the customer in other modules of the system.

While an effective presentation is a key aspect to the sales process, salespeople are often unable to get face-to-face with the final decision maker. Thus, some people who are involved in the buying decision may not have viewed the presentation presented using the presentation module 414. The information developed during the sales process by the salesperson must be presented to such people in a printed proposal form. For this purpose, the proposal module 412 is provided. The proposal module 412 automatically converts the customer solution developed using the other components and modules into a high-quality, personalized printed proposal including colors and graphics.

As with the presentation, the proposal generated using the proposal module contains information generated or presented to the customer using other modules of the sales system. As described above, while using the other modules of the system, information may have been tagged for use in a proposal. The information is automatically generated and incorporated into the proposal by the proposal module 412.

Many of the tools provided in the presentation module also are provided in the proposal module, such as an easy to use user interface, predefined and user defined templates, etc. The system allows for preview of the report on screen and appropriate editing capability. The fully integrated system facilitates the salesperson's preparation of the proposal while the user is interacting with the customer, for example, using the various modules of the system. Accordingly, at the conclusion of a meeting with the customer, a complete, customized proposal can be generated using all the information obtained from the customer throughout the process.

The proposal and presentation modules 412 and 414 are integrated with the rest of the system via the event manager 201A. The system recognizes key sales events as described above. For example, the generation of a proposal may automatically generate a follow-up to-do list in the self-management portion of the system. Additionally, the system may recognize the significance of proposal generation and note in the lead generation component 102 the name of a customer and the type of product or service the customer is interested in. This information can be used to generate automatic mailings to the customer about new related products.

Figure 5:
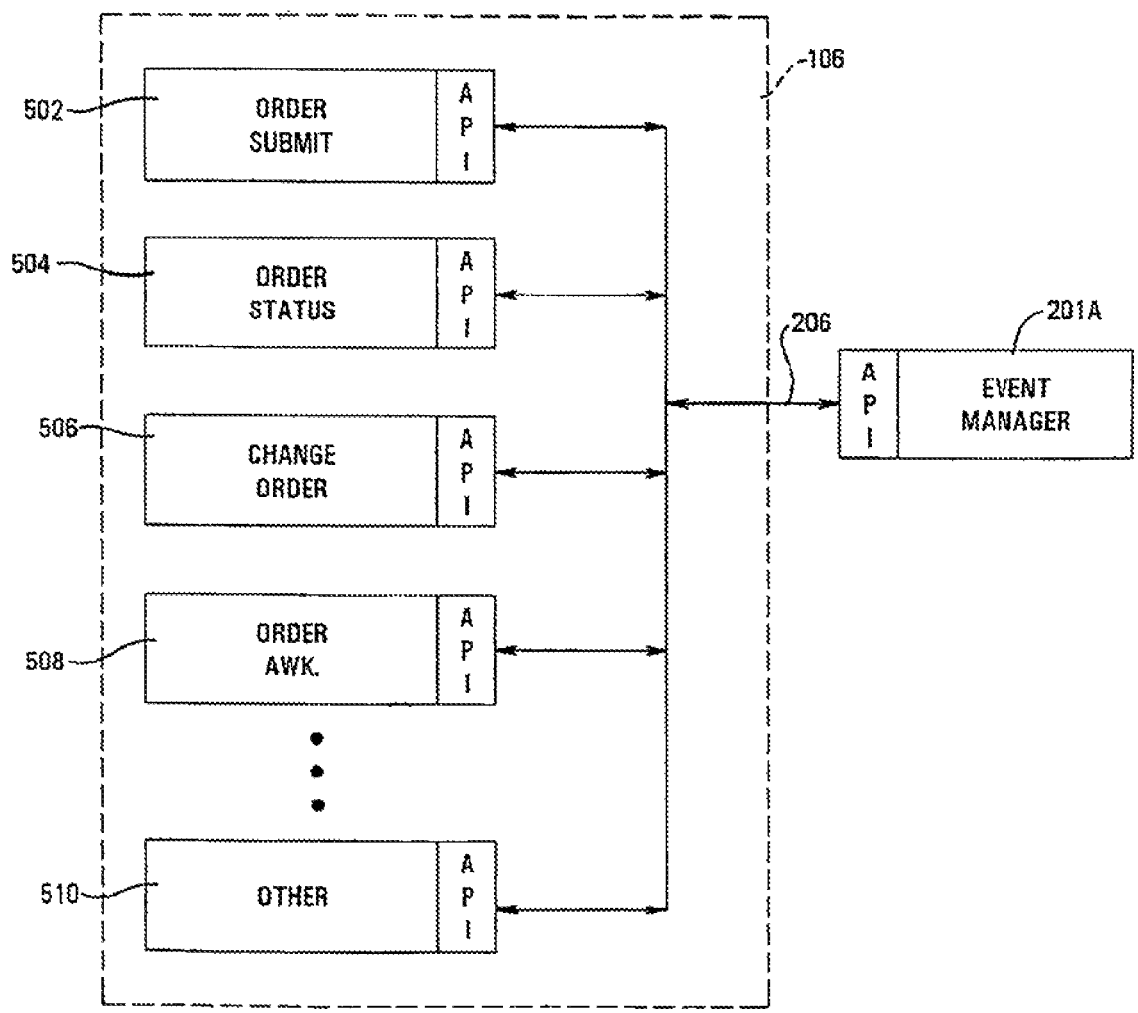
FIG. 5 illustrates an embodiment of an order management component of the system of FIG. 2.

FIG. 5 illustrates the subcomponent modules of the order management component 106. The order management component 106 includes an order submit module 502, an order status module 504, a change order module 506, an order acknowledgment module 508, etc. The order management component is integrated into the system to support the order creation and submission process, including configuration and pricing, at the point of sale. In this manner, a salesperson can use the system to automatically convert a customer "solution" to a purchasing need, developed using the time with customer component 104, into an order. This ensures that what was sold to the customer is actually ordered and subsequently delivered. Moreover, costs are reduced as administrative functions and errors are removed from the process. Customers are more satisfied because they receive what they ordered. Moreover, the order management component 106 allows the salesperson to directly prepare supplemental orders and changes. As a result customers are able to deal directly with the salesperson throughout the entire sales process, increasing customer satisfaction.

The order creation and submission module 502 is provided as part of the order management component to facilitate creation and submission of an order by adding any additional information to a proposal or quote required by the company's order fulfillment process such as "bill to", "ship to", delivery instructions, etc. All information previously entered via the other components and modules of the system, as relevant to the order, will automatically be reflected in the order creation and submission module 502. For example, product and option data for the order are obtained from the configuration module 406 of the time with customer component 104 to prevent errors in the order process. The module may prompt the salesperson for all additional required information and provide error checking and acceptance criteria to ensure adequate customer solutions are provided. The order acknowledgement module 508 receives an order acknowledgement which is passed back to the user through the communications component 118 in the back office system 200.

An order status module 504 is provided to allow the salesperson to inquire and monitor the status of an order at any time throughout the order process. The module may include facilities for automatically generating a periodic report for the salesperson to monitor the status of outstanding orders.

The change order module 506 allows the salesperson to request changes to orders that have already been submitted to the manufacturer. This module may be integrated via the back office system 200 with the enterprise order fulfillment process. Product and option data for a revised order may be provided from the configuration module 406 to prevent errors. For example, the configuration module 406 can be used when a change is requested to ensure that the change to the order does not affect other components of the ordered product. This information may then be directly passed to the change order module 506 of the order management component 106 for preparation and submission of a change order. The user is, again, prompted for all required information. Alternatively, the change orders may be produced directly in the change order module, with the change order module 506 being integrated with the configuration module 406 to automatically check the changed configuration for compatibility. Error checking and acceptance criteria can be applied to the changed order by the system to ensure adequate customer satisfaction.

The event manager 201A recognizes order events and initiates appropriate action. For example, the event manager may recognize an order for a customer and pass the customer name and product ordered to lead generation component 102.

Like the proposal, the order process may indicate a customer's potential interest in other related products. The event manager will further note the context in which a customer is linked to a product. A customer who has ordered a product is different than one who merely requested a proposal. While such information is useful, the event manager 201A recognizes the context in which the information was obtained and can automatically generate different responses based on the context. The event manager may also determine by accessing customer information databases whether the order is submitted by an existing customer on a first time purchase. If the order comes from a first time purchase, a letter can be automatically generated which reflects the new customer status.

Figure 6:
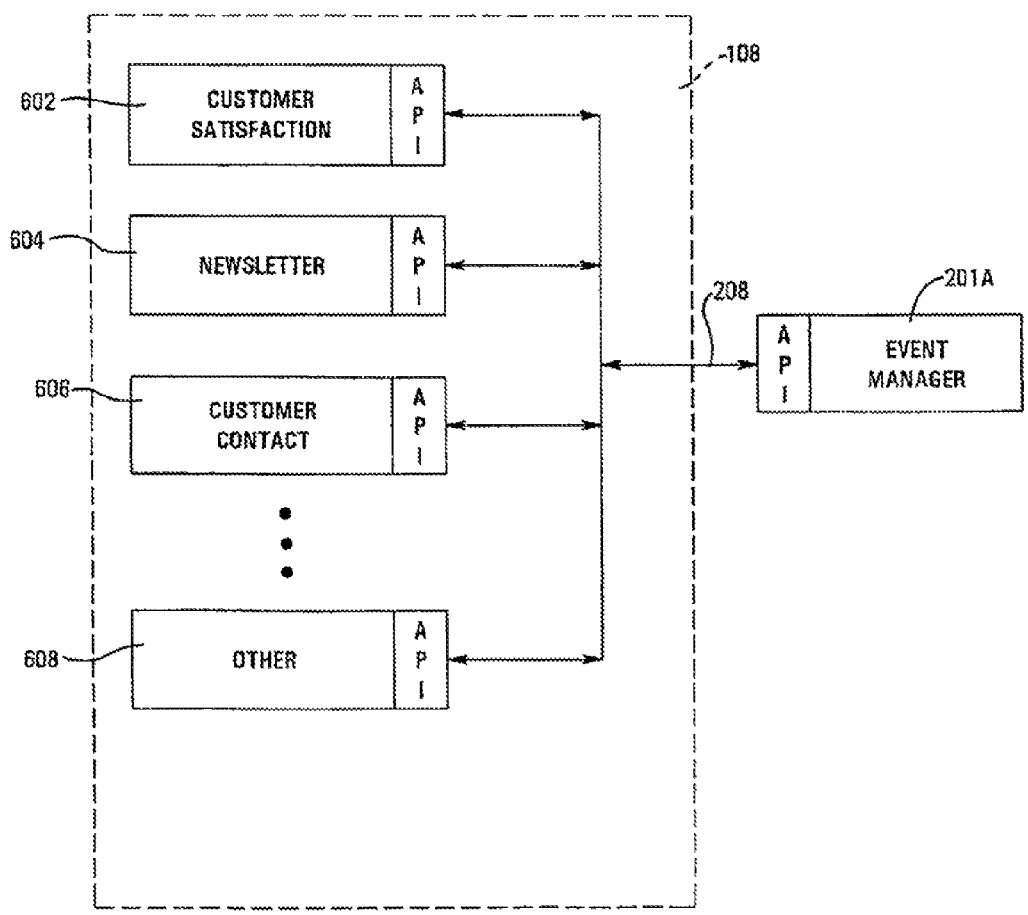
FIG. 6 illustrates an embodiment of a customer retention component of the system of FIG. 2.

FIG. 6 illustrates the subcomponent modules of the customer retention component 108. The customer retention component 108 includes a customer satisfaction module 602, a newsletter and mailings module 604, a customer contact module 606, etc. The subcomponent modules provide an integrated system for retaining customers as future, repeat customers. Two key aspects of the customer retention component 108 are provided in the systems planning capabilities and information sharing abilities. Using the customer satisfaction module 602, the salesperson, possibly with the assistance of the customer, develops a customer business plan. This allows the sales person to manage sales activities as they relate to the customer's business plan. The information obtained in developing the plan using the customer satisfaction modules 602 may also be referred to by other components and modules as desired. For example, if the salesperson is working with the customer to develop a new sales solution to a customers needs using the time with customer component, as a solution is specified the system may automatically refer to the customer's business plan to determine if the proposed solution is consistent with the plan. The customer satisfaction module 602 assists the salesperson in identifying key steps, deliverables, schedules, purchase goals, and key events for the upcoming year or period. The module also facilitates management of promotions which are set up between the salesperson and the customer.

The customer satisfaction module 602 is connected to the event manager 201A for integration with the self management component 110. The self management component 110 provides the functionality for the user to track and schedule the customer retention activities and objectives established using the customer satisfaction module 602. It is noted that the event manager 201A will recognize operations carried in the customer satisfaction module 602, the context in which the plan is developed and may direct the self management component 102 to automatically insert tasks and to do lists to assist the salesperson in following the plan.

The newsletters component 604 provides a mechanism for the system to generate and mail out newsletters to customers based on the information about the customer available within the databases of the data component 116. For example, the event manager may automatically recognize an event which occurs during the sales process with a potential customer, and notify the newsletter module 604 of the customer retention component 108 to place the particular customer on a newsletter mail out list.

The customer contact module 606 assists the salesperson in remaining aware at all times of any contact or activity between a customer and the company such as warranty, service, marketing responses, and customer support. The event manager 201A recognizes such events within the system and notifies the customer contact module 606. The salesperson may use the customer contact module 606 to review such contact with a particular customer. Information collected through other enterprise systems may also be transferred to the sales system to monitor ongoing customer satisfaction and new sales opportunities on the basis of information gathered via the other enterprise system.

Figure 7:
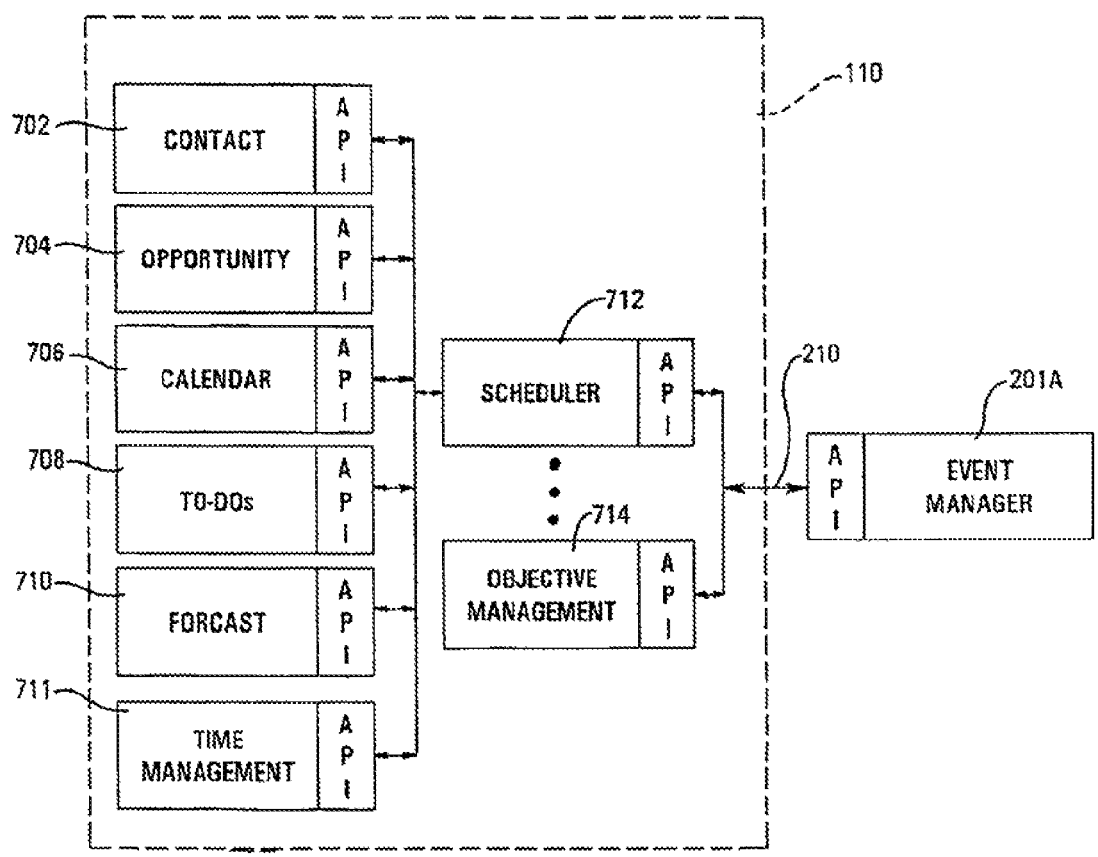
FIG. 7 illustrates an embodiment of a self management component of the system of FIG. 2.

FIG. 7 illustrates the subcomponent modules of the self management support component 110. As described above, the self management support component 110 provides tools to the salesperson to use throughout the sales process in conjunction with the core components of the sales process. The self management support component 110 includes a contact management module 702, an opportunity management Module 704, a calendar module 706, a "to-do" list module 708, a forecast module 710, and a time management module 711, each coupled to a scheduler module 712. The scheduler module 712 is coupled along with an objective management module 714 and other self management modules to the event manager 201A.

Through the event manager 201A, the subcomponent modules of the self management component 110 can be accessed as needed while using other components of the system. For example, the opportunity management module 704 can be accessed by the salesperson to assist in the time-consuming tasks of prioritizing opportunities, managing the sales process, communicating results, forecasting, reviewing progress, managing customer information and analyzing markets. As an integrated system, each of these task may be used as needed to effectively self manage the salesperson's time. Due to integration with the sales management component 112, the information can also be reviewed by the sales management team to help monitor the sales process and ensure that objectives are met.

Each of the subcomponent modules of the self management component 110 is optimized for use with other modules of the sales system. The self management component is used by the salesperson to manage opportunities, objectives, territory information, contacts, accounts, schedules, goals and tasks. The self management module performs interactively with each of the other components, for example, with the time with customer and order management components to recognize events and process information without requiring reentry by the salesperson. The self management component further supports team selling, workgroups and workflow environments. It further provides an intuitive solution for managing account relationships, opportunities and sales processes and information management. A flexible data architecture is used which allows information to be presented the way the user needs the information for a particular opportunity. Direct integration with word processing software is provided to develop correspondence, access templates and create unique reports. The self management component also supports e-mail and fax functions for the rapid distribution of information and correspondence to customers. By way of example, various subcomponent modules of the self management component are described below.

The contact management module 702 is provided to assist the salesperson in receiving, sending, creating, maintaining and managing information related to contacts and organizations (e.g. companies, groups, firms, etc.). The contact management module utilizes a relational data architecture which supports the ability to track and manage unique relationships of contacts, channels, and organizations. A user interface which provides rapid access to account and contact information is incorporated into the contact management module 702. An integrated communication facility provides the ability to receive leads from other data sources such as telemarketing (i.e. from the lead generation component 102) and other workgroups. The contact and organization information, as updated using the contact manager module 702, is utilized by other components to avoid reentry by the user. Information shared by the back office system 200 and enterprise system 209 provides account specific historical data. The system is further customizable by the salesperson providing user-definable fields that allow personal tailoring of information managed in the module.

A time management module 711 is also provided in the self management component 100. The time management module 711 allows the user to manage their schedule and tasks. Integration of the time management module with other modules and components of the system allows the system to enhance the salesperson's ability to manage multiple tasks and events. Activated process steps in the objective management module 714 (described below) are automatically scheduled for action in the time management module 711. The time management module supports multiple calendar views including daily, weekly, monthly views. A user interface having the ability to drag and drop tasks to a date for scheduling is provided. The time management module also provides direct integration with an e-mail system to receive or send group scheduling, requests and meeting arrangements. A task management subcomponent of the time management module 711 provides the capability to implement group tasks by project, priority, account and dates.

An objective management module 714 allows the salesperson to assign a process (i.e. a series of steps) to a given sales objective. The objective management module 714 provides a structured sales process for the salesperson by integrating the best knowledge and expertise of an organization's best selling strategies. The salesperson is able to view guidelines and recommendations for each step and recommendations to overcome possible obstacles to move a prospect through a sales cycle. Critical sales information and opportunity status is communicated between the sales personnel and management by the integration of the objective management module of the self management component 110 and the sales management component 112.

Using the objective management module 714 sales process steps and guidelines may be uniquely developed for each type of sales opportunity. The module may include a checklist feature that allows the user to utilize forms and lists to gather a uniform set of information needed for each opportunity or account profile. The salesperson may customize or insert additional process steps for a given opportunity. The system may automatically calculate the probability of closing the sale with the date and value of each opportunity and process and consider both the sales status and the customer's buying status. The integration with other components of the system allows the salesperson to quickly access opportunity, activity and value. The integrated automated support of opportunity management is facilitated by recognition of key opportunity events such as proposal creation and order entry via the event manager 201A, which automatically initiates other actions within the system.

A forecasting module 710 is also provided within the self management component 110. The forecasting module 710 provides functional and product forecast information to the salesperson related to sales, revenue, commission and profit sorted by accounts or products identified in the sort criteria. The forecasting capability providers information to the salesperson to enhance planning and prioritization of efforts. Integration with the sales system allows the forecasting module 710 to present information based on model, components customer, time, and other criteria.

The forecasting module 710 also provides the salesperson with automatic reporting capabilities including win-loss ratios, actual versus goals, commissions, and period-to-date status. Opportunity status may be presented on a system calculated or a user estimated basis. The module utilizes data for closed sales, data for opportunities with a stated prediction of close, or data for a combination of both as received from other components of the system to generate forecast reports. The module produces graphical and tabular displays of reported information. Forecast related data is made available for use by enterprise information management systems by the forecast module.

Figure 8:
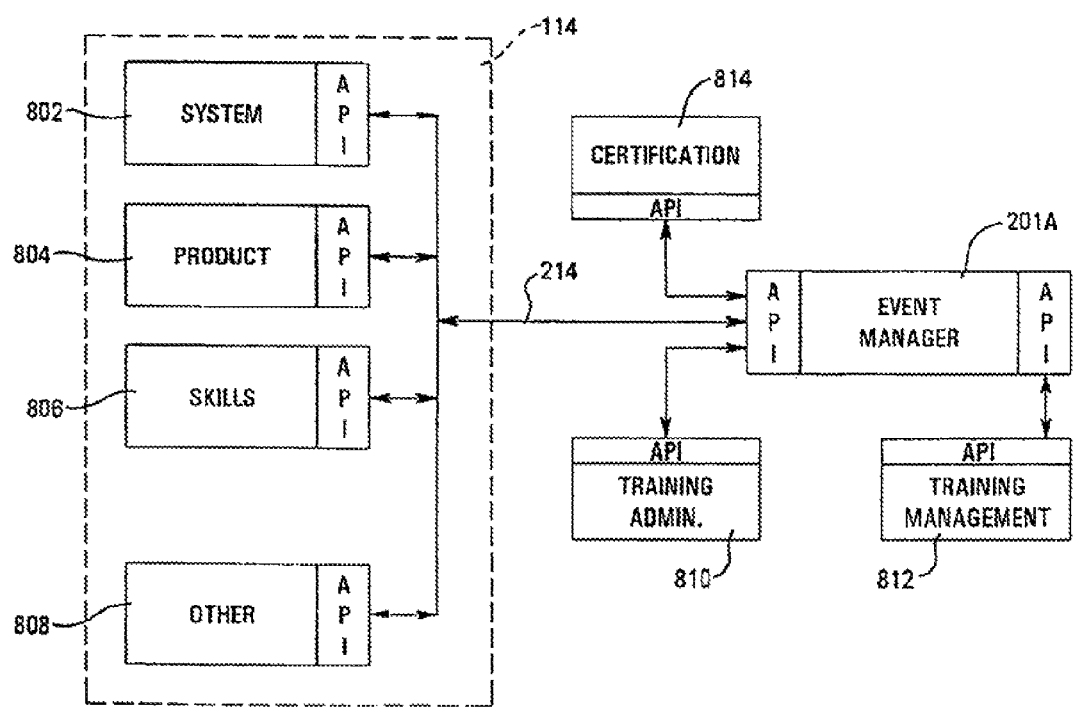
FIG. 8 illustrates an embodiment of a training component of the system of FIG. 2.

FIG. 8 illustrates the subcomponent modules of the training component 114. The training component 114 includes a system training module 802, a product training module 804, a skills training module 806, etc. The completely integrated system allows salespersons to sell and train with the same system. The integrated on-line training, using the same system as the salesperson uses in the field eliminates traditional expensive classroom training. Moreover, the combination of the subcomponent modules facilitates integrated sales training in three key areas: product knowledge, sales skills and system usage. The integration also allows the salespeople to follow a self-paced routine to build their expertise using live data and functionality.

Each of the training modules 802, 804 and 806 are computer based training modules which present pre-built computer-based training courses to the user and which gather completion data for training administration and status reporting. The modules access, reformat and present product data from the common database. Data can include, for example, specifications, graphics, multimedia and competitive information. The ability of the computer-based training to access the actual working modules of the sales system provides a familiar working interface to the user. The training component 102 is further supported by a training administration module 810, a training management module 812, and a certification module 814. The training management module 812, illustrated in FIG. 8, will typically reside in the sales management component 112 of the system. The training management module is used by the system to report, monitor and coach the salesperson during training. Training events carried out by the salesperson are recognized by the event manager 201A, and provided to the training management module 812.

As described above, the training component 114 is integrated to the other components of the sales system to provide a common user interface and a common platform for training and selling. Common data and media (graphics, video, etc.) utilization with the time with customer component 104 provide common reference material and reduce local storage requirements. The training administration module 810, typically provided when in the self management component 110, is further integrated to allow the user to manage their own training and self-improvement requirements. Integrated with the modules of the time with customer component 104, the certification module 814 certifies salespersons for use of the system for particular products lines or data and can require certain pre-determined levels of competency before access to the modules within the time with customer component 104 is granted.

The training administration module 810 provides an overview of the user's employee development requirements (i.e., required training events), the associated certification tests and the recommended sequence of progression. This module controls access to the user's individual training events based upon prerequisites and the individual's completion of those prerequisites as determined by the certification tests carried out in the certification module 814. It also provides a link to the training and test engine of the system.

The training administration module 810 is integrated with the objective management module 714 of the self management component 110. In this manner, the module allows the assignment and tracking of personal training objectives and schedules. The training administration module 810 identifies both required and optional training events which may be driven by the salesperson's actual usage of the system. The system may automatically notify the user of scheduled training events or performance evaluations and will automatically update the user's time management module 711 of the self management component 110.

The certification testing module 814 presents skill or knowledge certification tests to the user, scores responses, provides review or remediation suggestions, and gathers the necessary information used for training administration and reporting. The knowledge tests generated by the certification module 814 are computer-generated multiple choice, matching or true/false questions or end user completion. The module calculates the score, records the results and provides feedback to the user. Skills tests are performance checklists to be completed and updated by the supervisor or evaluator. Thus, the certification module 814 supports evaluation of skill areas where written tests would not adequately measure proficiency.

Figure 9:
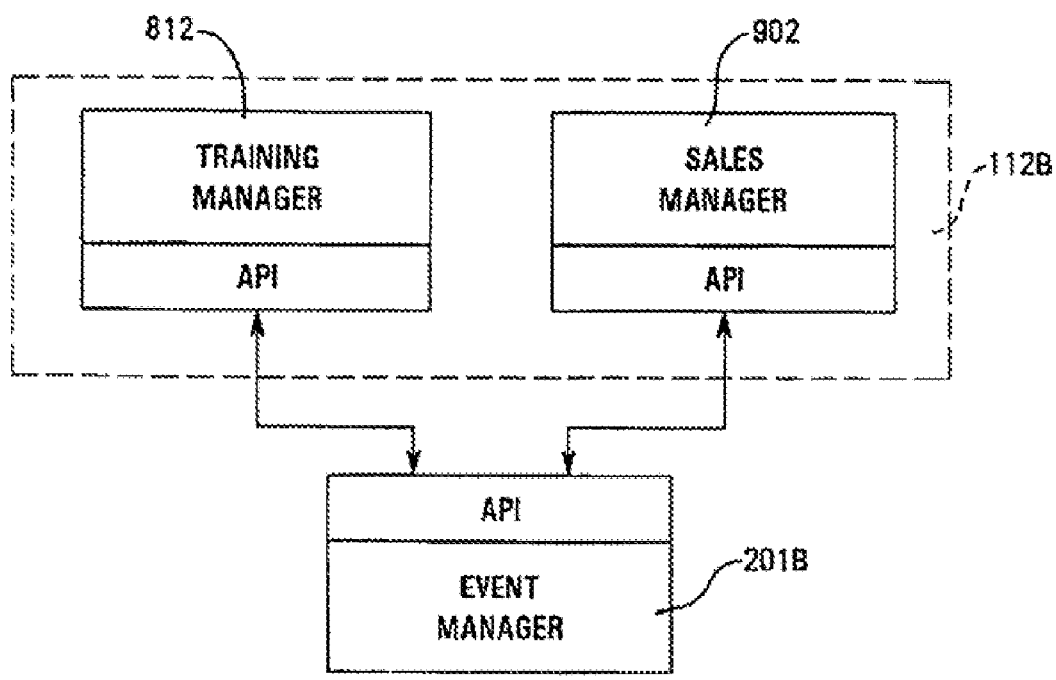
FIG. 9 illustrates an embodiment of a sales management component of the system of FIG. 2.

FIG. 9 illustrates the sales management component 112B connected to the event manager 201B. As illustrated, the sales management component 112B is comprised of modules that are optimized for use with other modules of the sales system. Typically, a sales manager has responsibility for both management of sales personnel and direct sales accountability for certain clients. In this fashion, the sales manager component 112B is an integrated component of the sales manager's sales system. As described above, when the sales manager is located at the home office, the sales manager component 112B is located in the back office system. Alternatively, if the sales manager is mobile, the sales manager component will be located in the salesperson support system 100. The functionality, however, remains substantially the same. The sales manager module 902 of the sales manager component 112B is used by the sales manager to forecast, coach, plan performance, assign tasks, review territories, handle commissions, assign task capabilities, etc. The fully integrated system also provides a common platform between the sales personnel and the sales management personnel to enhance communication and reduce redundant or administrative activities. The system is integrated to permit the sales manager access to the salesperson's usage of the system and further provides objective feedback on the status of sales, performance, goals and other events. It further provides the sales manager with the ability to coach and monitor activities of sales people and enhances the ability to forecast sales and related information such as product requirements, product mix, revenue and profit, commissions, pipeline status, etc.

Figure 10A:
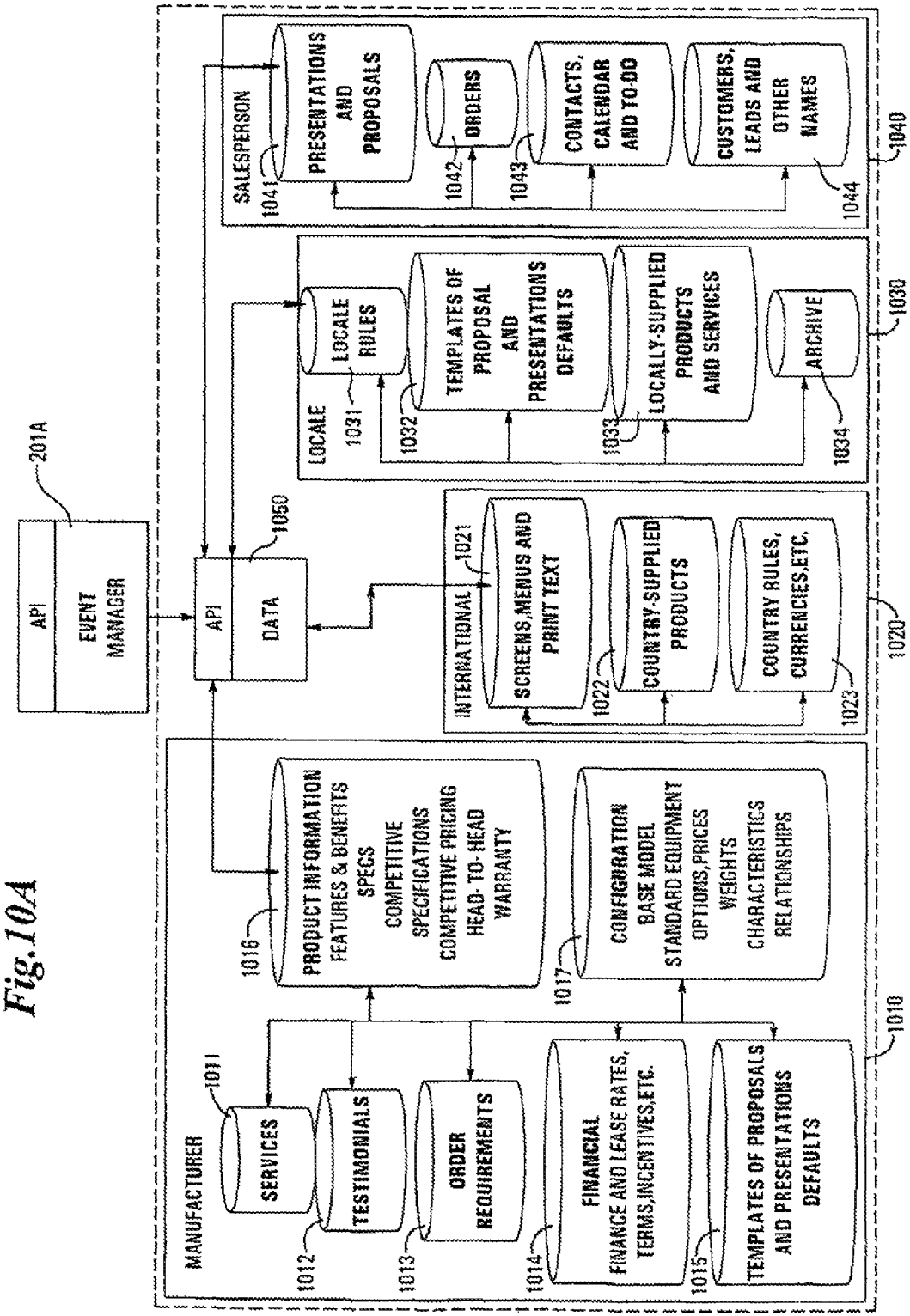
FIGS. 10A and 10B illustrate an embodiment of a data component of the system of FIG. 2.
Figure 10B:
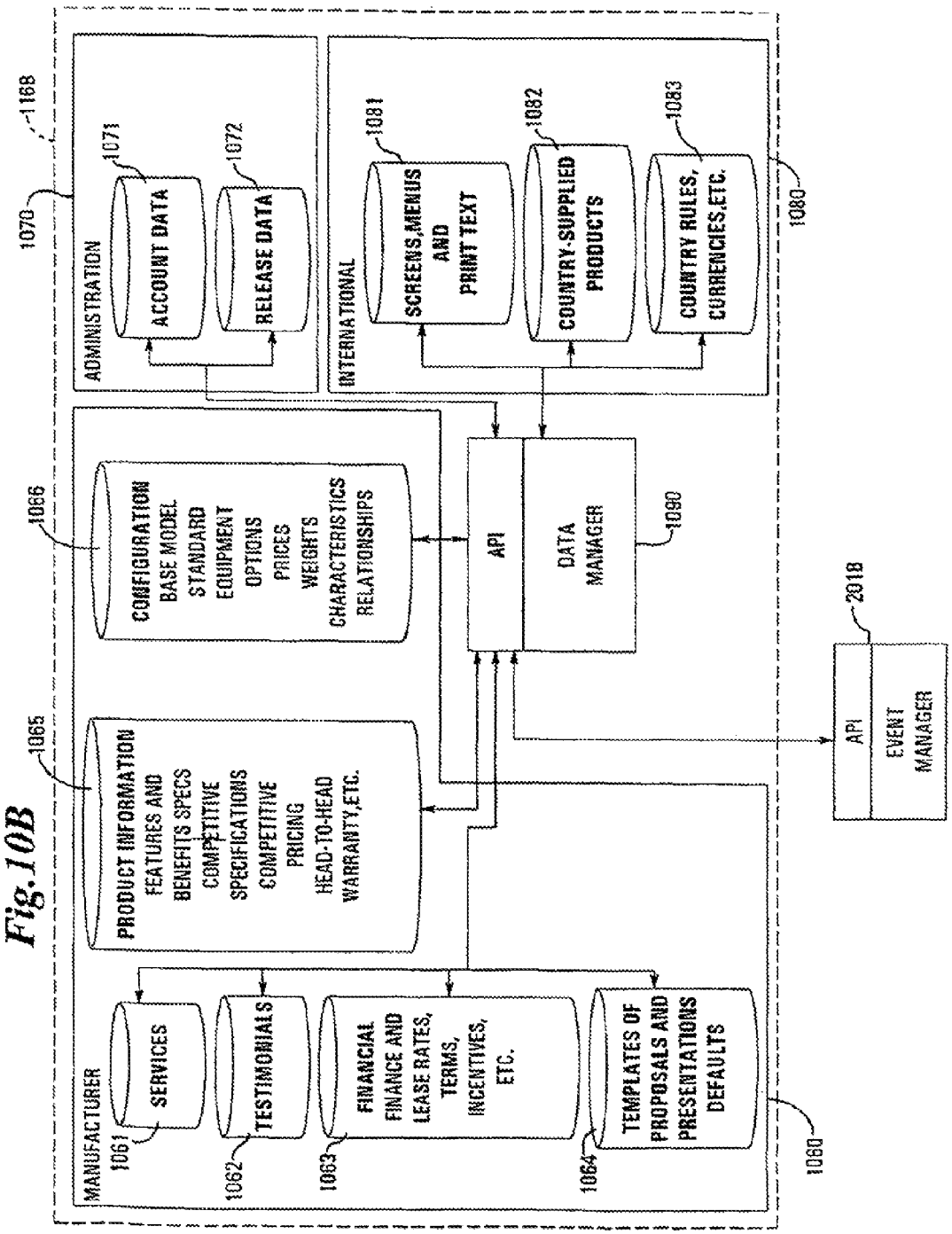

FIGS. 10A and 10B illustrate an embodiment of the data component 116 including data components 116A and 1168. As illustrated in FIG. 10A, the data component 116A includes a data manager 1050 connected to the event manager 201A. The data component 116A also includes a number of local storage area groups made up of various databases. The storage area groups are divided into a manufacturer storage group 1010, and an international storage group 1020, a locale storage group 1030 and a salesperson group 1040. The various storage groups may be all stored in a single large memory file or may be in separate memory files.

The manufacture storage group 1010 includes a services database 1011, a testimonials database 1012, an order requirements database 1013, a financial database 1014, a template of proposals and presentation database 1015, a product information database 1016 and a configuration database 1017. Each of these databases supports the operation of one or more subcomponent modules of the above described components in the salesperson support system 100. For example, the financial database 1014 includes up-to-date finance and lease rates, terms and incentives. The product information database 1016 includes data related to the features and benefits of a product, the specifications for the product or service being sold, comparative specifications, etc. The configuration database 1017 includes data related to a base model, for example, standard equipment, options, prices, weights, characteristics and relationships of the product.

The international storage group 1020 allows the integrated sales system to be used world wide. The international storage group 1020 includes databases for screens, menus and print text in various languages 1021, country-supplied products 1022, country rules, currencies, etc., 1023.

The locale storage group 1030 includes databases for locale rules 1031, templates of proposals and presentations 1032, locally-supplied products and services 1033 and archive 1034.

The salesperson storage group 1040 maintains databases for the salesperson. For example, databases for generated presentations and proposals 1041, orders 1042, contacts, calendar and to-do items 1043, customers, leads and other names 1044, are provided.

The local storage database of data component 116A is optimized for the mobile, disconnected sales environment. Data is optimized to assure security, fast response time, and to provide as much information as possible without requiring the user to "connect" to the global storage of data component 116B of the back office system 200 described more fully below. All components and subcomponent modules of the salesperson support system 100 use a common data architecture.

The data component 116B contains global storage databases divided into a number of storage area groups. A data manager 1090 is connected to the event manager 201B via respective APIs. A manufacturer storage group 1060 stores global information corresponding to the manufacturer storage group of the data component 116A. As described more fully below, the information in the global storage of the data component 116B can be updated using the data tools. The updated data will subsequently be communicated to the salesperson support system 100 to update the local storage of the data component 116A.

The data component 116B also contains an international storage group 1080, having databases corresponding to the international storage group 1020 of the data component 116A. An administration storage group 1070 is also provided in the data component 116B. This group includes an account data database 1071 and a release data database. The event managers 201A and 201B, data managers 1050 and 1090, facilitate a proper exchange of data between the local storage of data component 116A and the global storage of the data component 116B.

It is noted that the data in the data component 116B of the back office system is stored in an open database format (e.g., ODBC) to provide maximum compatibility with different systems. This facilitates the importation of data from other enterprise system databases for use by the system 20. It further provides for maximum usability of the data. Such open databases, however, require large amounts of storage space. Thus, a data optimizer is provided in the data tools subsystem 205 of the back office system 200 (FIG. 2), to convert the data into a run time product knowledge database. The optimized database is tuned for speed, size and security. When data is transferred from the data component 116B to the data component 116A, it is first optimized. The databases of the data component 116A store information in the optimized format. Thus, the storage requirements are minimized and the transfer time is reduced.

Figure 11:
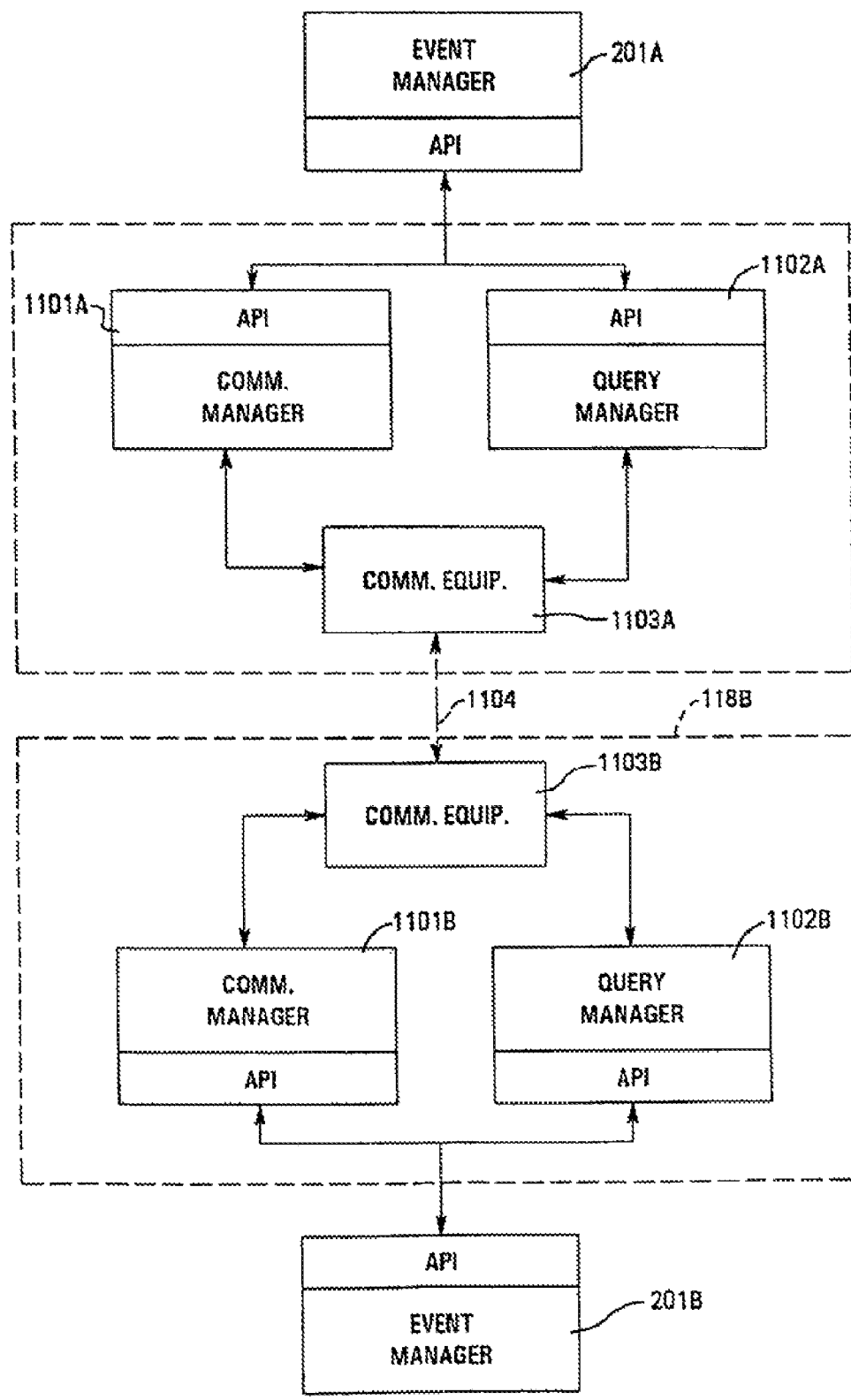
FIG. 11 illustrates an embodiment of a communication component of the system of FIG. 2.

FIG. 11 illustrates the subcomponent modules of the communications components 118A and 118B. The communications components 118A and 118B have respective communications managers 1101A and 1101B and query managers 1102A and 1102B. The communications managers 1101A and 1101B handle communications from the salesperson support system 100 to the back office system 200 including orders, change orders, mail etc. Further communications from the back office system 200 to the salesperson support system 100 are handled by the communications managers 1101A and 1101B. These communications include data updates, product information, leads, incentives, mail, system updates, etc. Thus, the communications managers 1101A and 1101B must have the ability to receive incoming information and to process outgoing information.

The query managers 1102A and 1102B communicate between the two systems related to inquires. For example, the query managers handle communication of information related to inventory inquiries, order inquires, price inquires, etc.

The communications components 118A and 118B also include respective communication equipment 1103A and 1103B. The communication equipment communicatively couple the two systems as illustrated by the dotted line 1104. The equipment may include network connections and lines, modems, satellite communications technology, etc. Communication between the two systems is controlled using the event managers 210A and 2016 and the communication managers 1101A and 1101B and query managers 1102A and 1102B.

Figure 12:
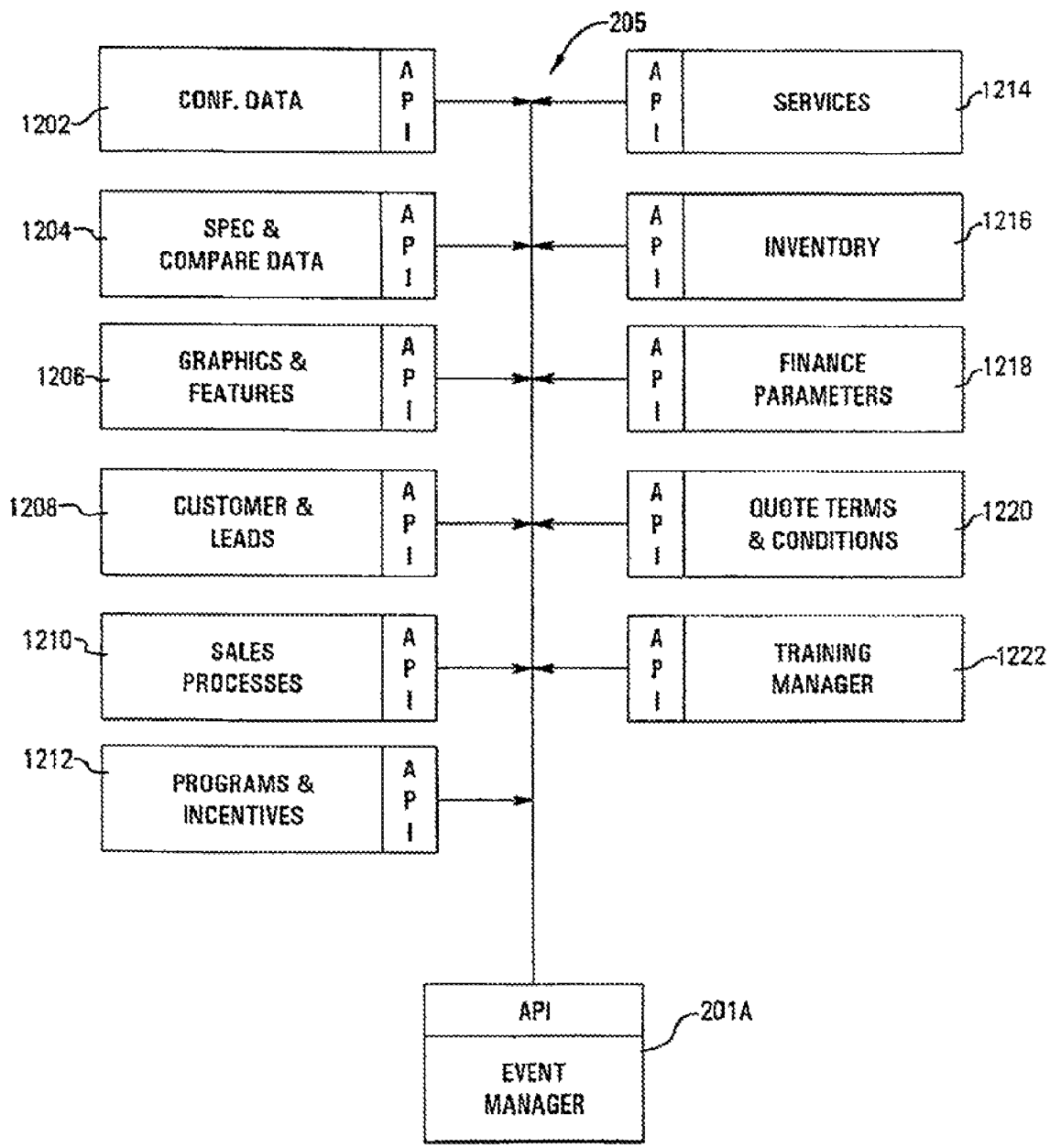
FIG. 12 illustrates an embodiment of a data tools subsystem of system of FIG. 2.

FIG. 12 illustrates in greater detail the data tools subsystem 205 of the back office system 200. As illustrated in FIG. 12, the data tool subsystem 205 includes a number of data tools used to edit and maintain the data. The data tools include a configuration data tool 1202, a specifications and comparison data tool 1204, a graphics and feature information data tool 1206, a customer and leads data tool 1208, a sales processes data tool 1210, a programs and incentives data tool 1212, a services dated tool 1214, an inventory data tool 1216, a finance parameters data tool 1218, a quote terms and conditions data tool 1220, and a training management data tool 1222.

The configuration data tool 1202 allows data maintenance personnel to create, edit and update the configuration portions of the knowledge database. The configuration data tool 1202 includes an editor, allowing the user to create and edit the database, including international portions of the database. The configuration data tool 1202 may be used to carry out such functions as data modeling, data editing, auditing, security, and internationalization. The configuration data tool may also be provided with interfacing capability to be used with a data pre-processor to incorporate data from other electronic sources. A data optimizer is used to place the data in the optimized, encrypted run time format.

The specifications and comparison data tool 1204 allows the data maintenance personnel to create, edit and update the specifications for the products, as well as specifications of competitor's products. This data is also stored in the knowledge database. Like the configuration data tool 1202, the specifications and comparison data tool 1204 includes an editor allowing a back office user to create and edit the database including international portions of the database. The tool can also be used in conjunction with the data pre-processor to incorporate data from other electronic sources. As with the configuration data tool 1202, the specifications and comparison data tool uses the data optimizer to place the data in the optimized run time, encrypted format. The tool may also include data auditing and security functionality.

The graphics and features data tool 1206 is provided to assist data maintenance personnel in creating, editing, updating and adding text to graphics screens. The resultant data is stored in the knowledge database. The tool includes an editor which allows users to create and edit the textual portions of graphics screens. The graphics and features tool 1206 may be used in conjunction with a scanning device and/or graphic creation and drawing tools to create graphic images. The tool creates the run time database.

The customer and leads data tool 1208 allows back office personnel to maintain and control the data entities and relationships required for the contact management module 702, provided in the self management component 110. The tool includes import and export capabilities enabling the system to process information to and from other enterprise databases such as telemarketing, customer services, warranty, and management information systems. In this manner, leads can be passed from these other entities directly to the salesperson through the customer and leads data tool 1208.

The sales processes data tool 1210 is provided to create, edit and maintain data elements used to support the objective management module in the self management component of the salesperson support system 100. This tool is used to identify steps and scheduling for processes, develop guidelines for these steps, create checklists for consistent data collection, and enter required follow-up requirements. In addition, a data and formula matrix used to calculate probability of closing sales opportunities is provided within the sales processes tool 1210.

The finance parameter data tool 1218 is used to maintain the values, plans and defaults for credit and finance information used by the finance module of the time with customer component of the system. The finance parameter tool 1218 allows maintenance personnel to add or edit interest rates, set finance and lease plan requirements and parameters, control plan and option availability, establish report requirements and set finance plan valid dates.

The quote terms and conditions data tool 1220 is provided to allow back office system 200 maintenance personnel to control and maintain the terms and conditions used by the quotation module of the time with customer component system. Tax requirements, special fees, discounts and profitability calculations may be set using this tool.

The other data tools are similar in construction and provide similar functionality to those described in greater detail above. Each of the data tools is connected to the event manager 201B, which handles the flow of information throughout the system.

Figure 13:
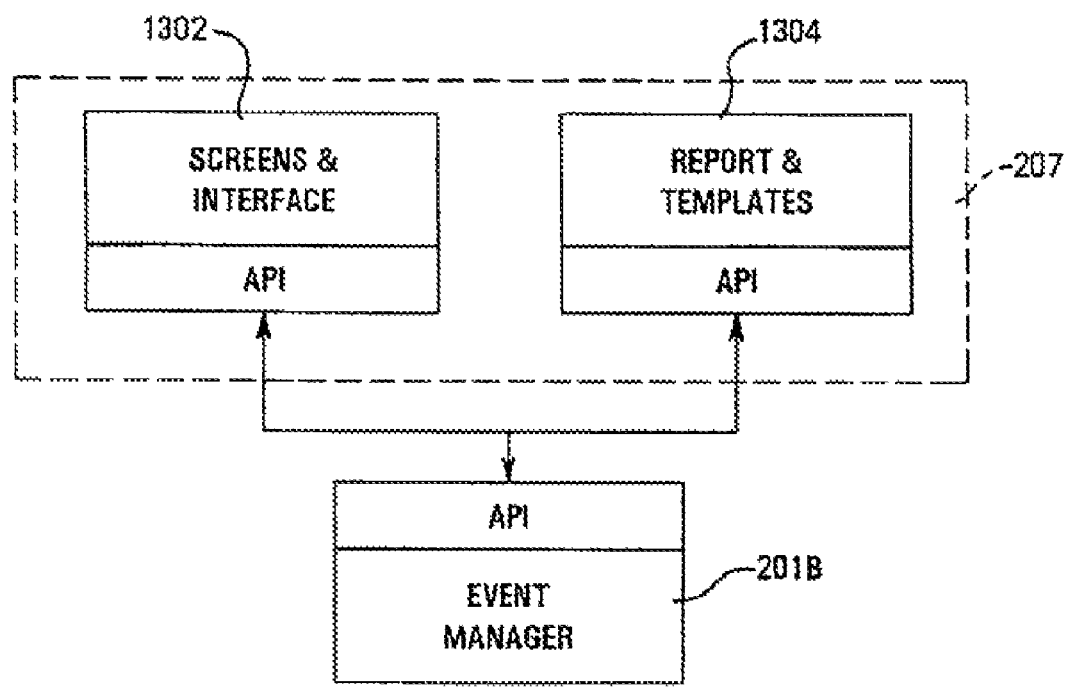
FIG. 13 illustrates an embodiment of a system tools subsystem of the system of FIG. 2.

FIG. 13 illustrates in greater detail the system tools subsystem 207 of the back office system 200. The system tools subsystem 207 of the back office system 200 includes screens and interface subcomponent module 1302 and a report and templates subcomponent module 1304. The screens and interface module 1302 is used by back office personnel to modify the language or terminology of the screen elements such as controls, buttons, menus, field labels, etc. International language selection can be supported with this tool to provide a sales system usable by salespeople in different languages. The reports and templates module 1304 is provided to modify and create a sales system report format and content. The module may also be used to create and modify proposal templates. Each of the modules is connected to the event manager 201B as illustrated.

Figure 14:
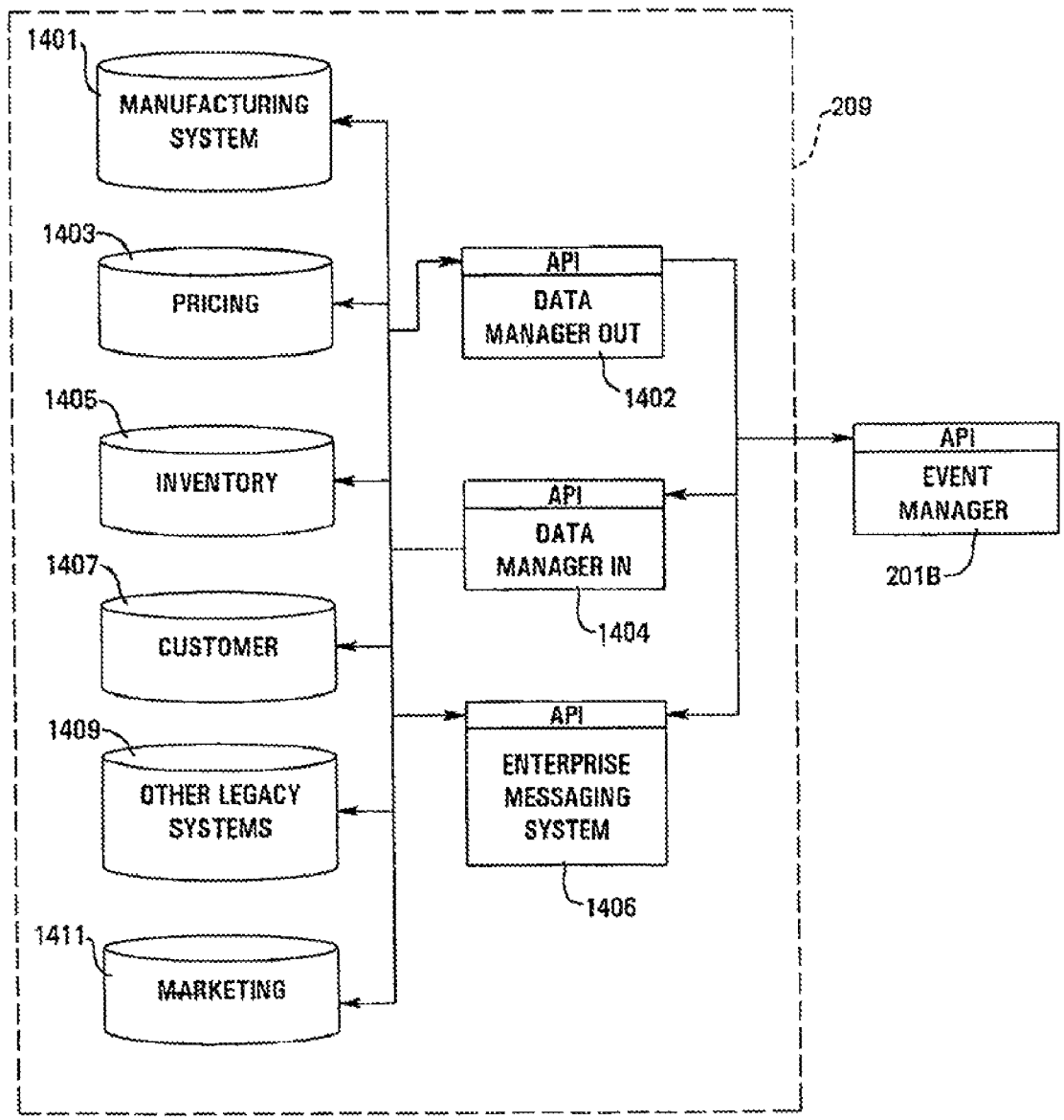
FIG. 14 illustrates an embodiment of an enterprise system subsystem 209 of the FIG. 2.

FIG. 14 illustrates in greater detail the enterprise system subsystem 209 of the back office system 200. The enterprise subsystem 209 of the back office system 200 is made up of a number of databases and a number of data managers. The system includes a manufacturing system database 1401, a pricing database 1403, an inventory database 1405, a customer database 1407, other legacy system databases 1409 and marketing databases 1411. An out box data manager 1402 manages data output from the databases of the enterprise system 209 and supplies the output information to the event manager 201B. An in box data manager 1404 receives data from the event manager 201 and stores the data in the appropriate database of the enterprise system 209. An enterprise messaging system manager 1406 is provided to communicate information between the event manager 201B and the various databases of the enterprise system 209.

Figure 15A:
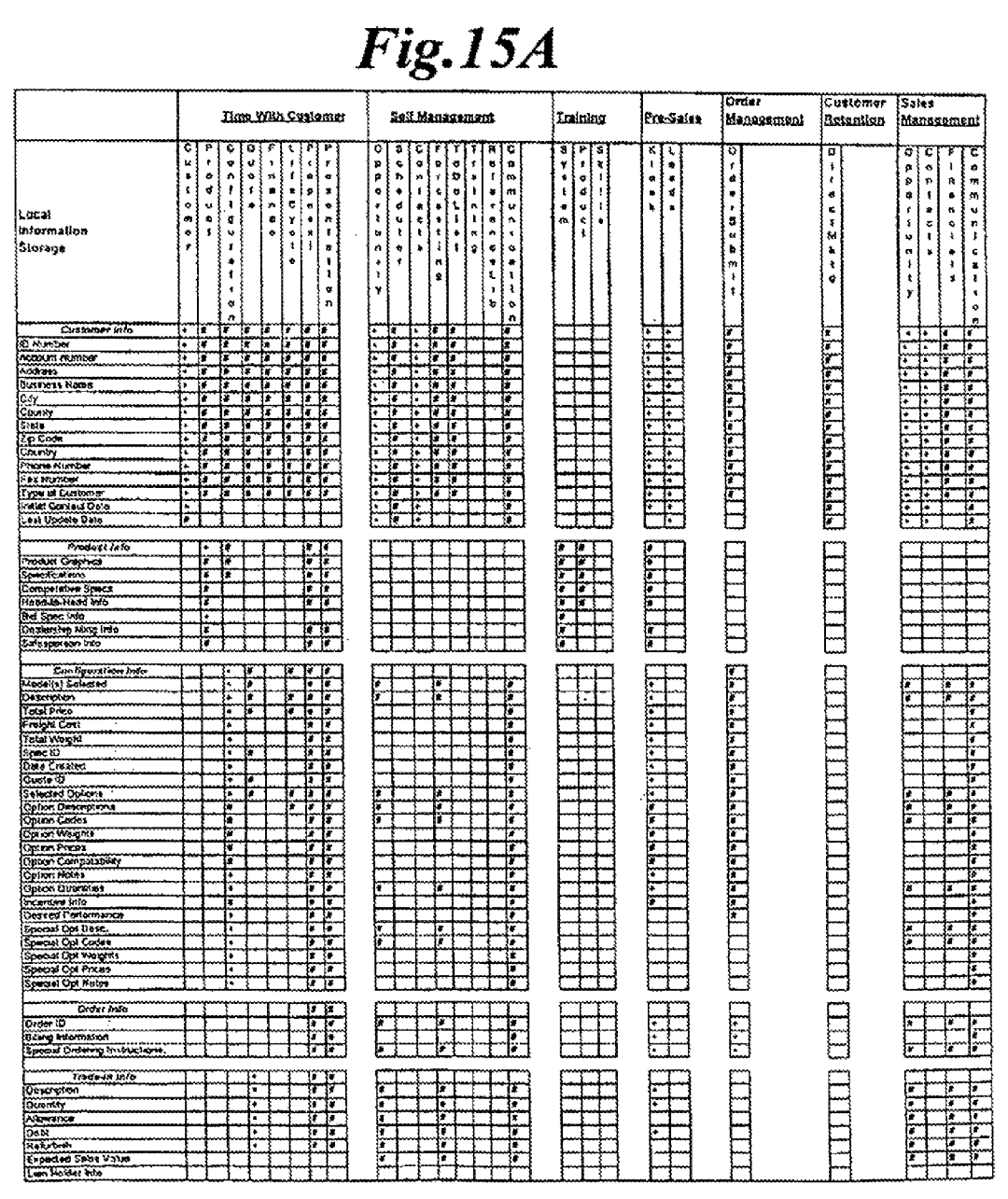
Figure 15B:
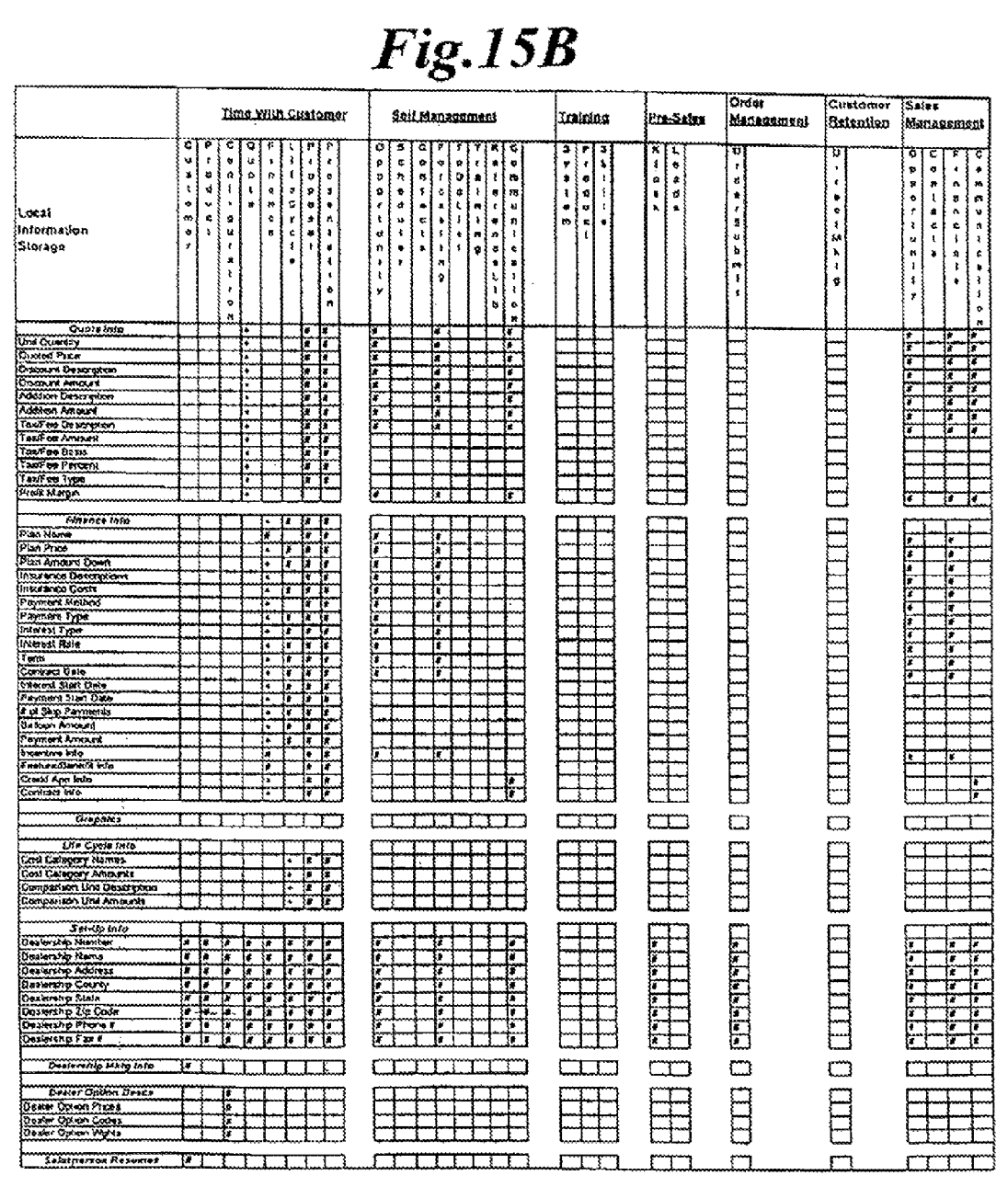

FIGS. 15A-15C illustrate in table form an example of how data may be organized in the local information storage databases of the data component 116 of the salesperson support system 100 and the back office system 200. The routing of data, proper classification of data, etc., is controlled by the event manager 201.

In the tables, the various types of information stored and used by the sales system are listed by category. For example, FIG. 15A illustrates the types of customer information typically gathered and used during the sales process. Also illustrated in the tables are the various core components 103 of the salesperson support system 100 and the support process components 105. Exemplary subcomponent modules are also illustrated for the various components. The table illustrates how each of the subcomponent modules, under control of the event manager 201, is granted access to the particular types of data. Subcomponent modules marked with a "+" symbol have access to the corresponding data for both read and write purposes. Subcomponent modules marked with a "#" symbol have read only access to the corresponding data. Subcomponent modules left blank do not have access to the data.

As illustrated in FIGS. 15A-15C, the data may be used commonly by more than one of the various components and subcomponent modules. In this manner, the components and modules are integrated together for a common exchange of information via the event manager 201. As illustrated, data stored in a single location is used by the various components and subcomponent modules during different phase of the overall sales process. It is can also be appreciated from the tables of FIGS. 15A-15C that data which is updated using one module will be automatically reflected in other modules which rely on the particular data. In this manner, the salesperson can be confident that the most recent data is being used since regardless of when in the sales process the data is changed it will be automatically reflected in each component which relies on the data.

By way of example, a salesperson meeting with a current customer may learn that the customer has moved to a new address. Using the self management component 110, the salesperson enters the new address information into the customer information database. The event manager 201A recognizes this event. If the customer currently has an order not yet delivered when the data is updated in the common database, the event manager 201A instructs the order management component 106 to automatically reflect the change. Alternatively, the event manager 201A can be used to prompt the salesperson that the data which is being updated is being used or relied upon by another component of the sales system. The salesperson can confirm that the updated information should be used in other parts of the system. For example, the system will inquire under control of the event manager whether the change in address requires a change in the delivery address for an order. If the new address should be used for the delivery, the change order subcomponent module 506 is initiated with the new information reflected and a command is given to update the delivery address information in the order. Thus, the order will now reflect the proper address information ensuring proper delivery.

FIG. 15C illustrates another example of how the fully integrated sales system uses the common exchange of information to facilitate the overall sales process. Using the self management component 110, the salesperson generates a forecast with the forecasting subcomponent module for the upcoming year. The forecasting module accesses information generated with the quote module to prepare quotes for customers, such as unit quantity, quoted price and discount description, thereby basing the forecast on the most recent quotes which the salesperson has prepared.

Figure 17:
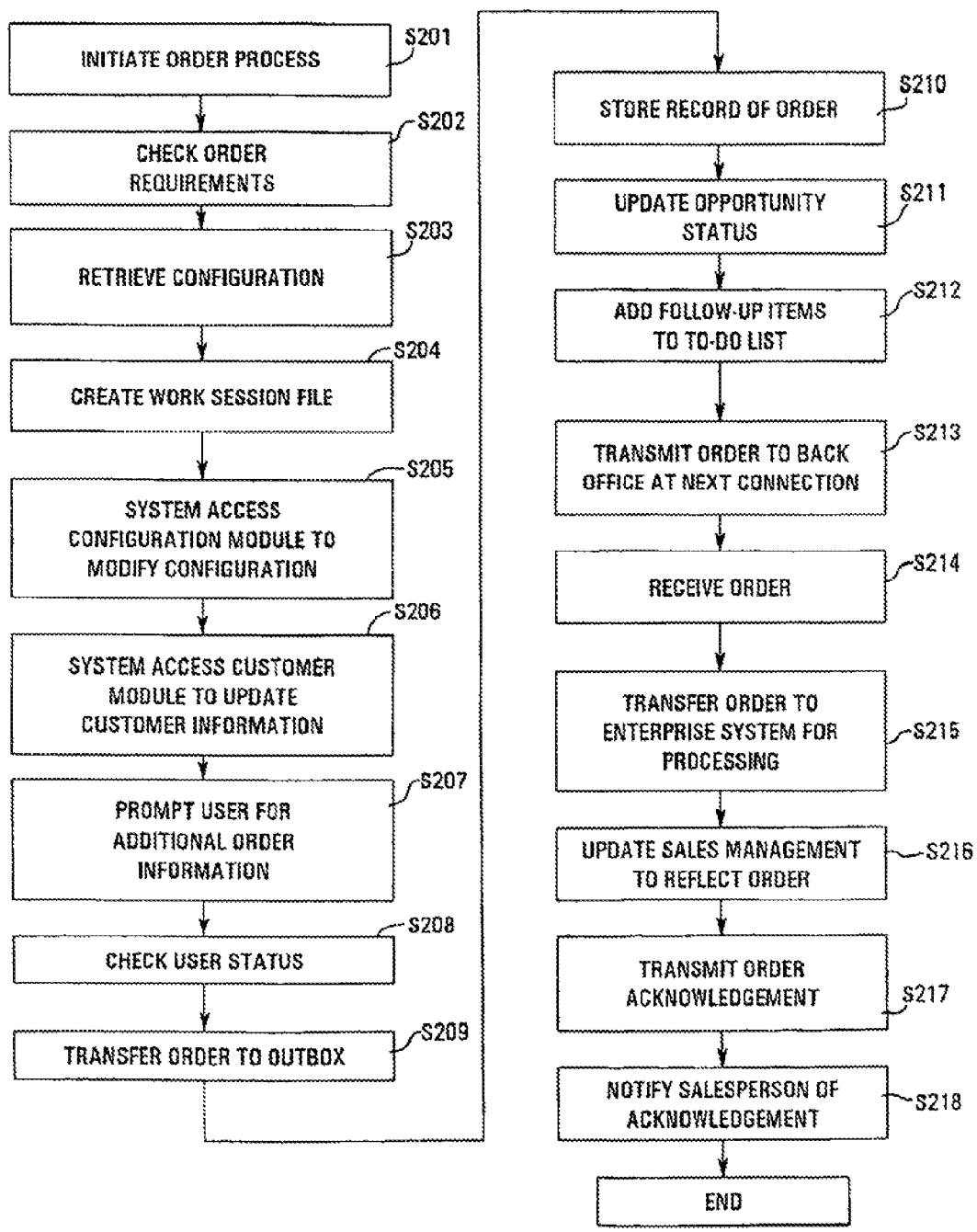
FIG. 17 is a flow chart illustrating another operation of a system in accordance with an embodiment of the invention.
Figure 18:
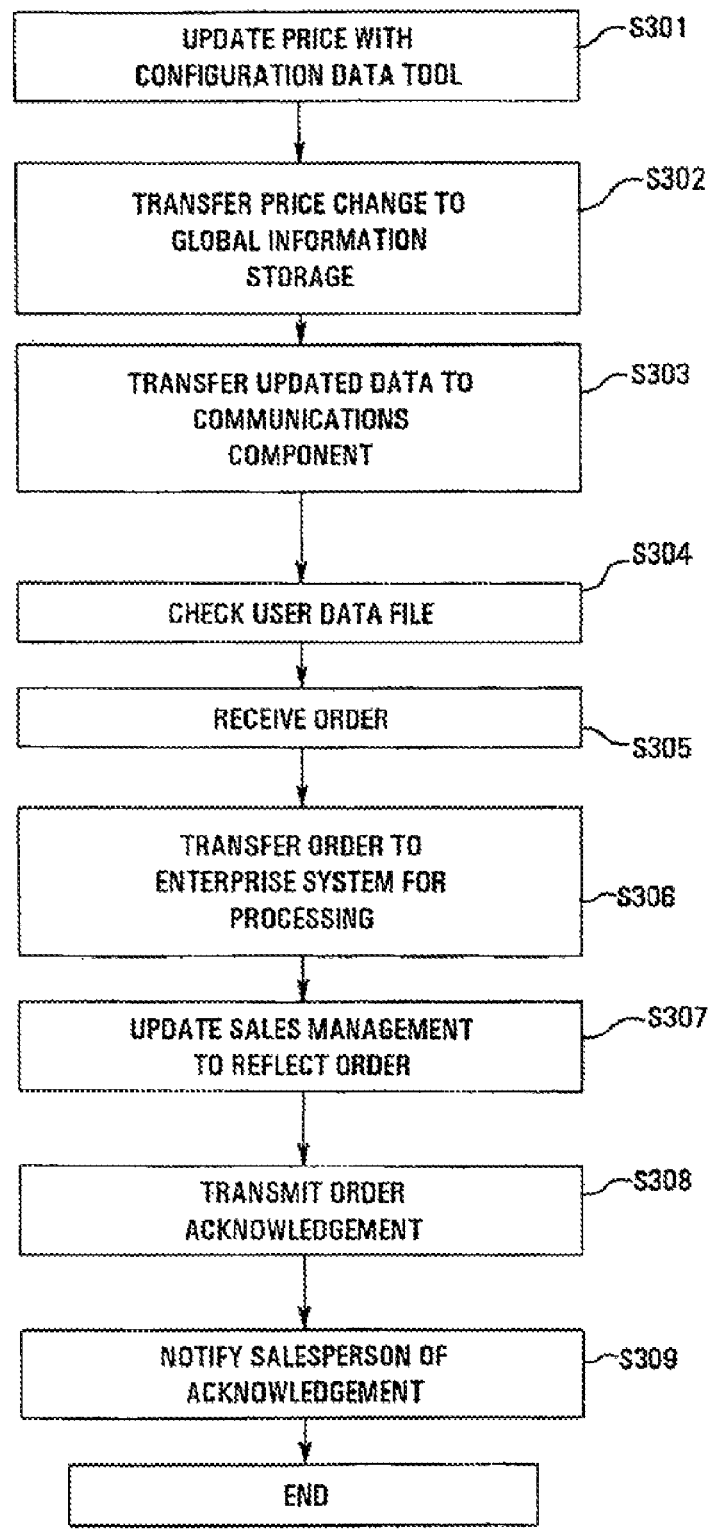
FIG. 18 is a flow chart illustrating still another operation of a system in accordance with an embodiment of the invention.

FIGS. 16-18 are flow charts illustrating the operation of the above described embodiment of the invention. Referring to FIG. 16, the operation of the system when used to generate a proposal will be described. At step S101, the salesperson using the salesperson support system 100 accesses or generates customer information for a proposal. The system may invoke the contact module 702 of the self management component 110 and retrieve data from the salesperson storage group 1040.

At step S102, the product module 402 of the time with customer component 104 (FIG. 4) is used to tag features and benefits, as well as competitive information for the proposal to be generated.

At step S103, the configuration module 406 of the time with customer component 104 is used to create a customer solution. As described above, the configuration may previously have been created and the information residing therein may automatically be used at this step to generate a customer proposal. At step S104, the quote module 408, finance module 410, and any other needed modules are accessed and used to prepare all of the desired information to be included in the proposal. At step S105, certain selections of the proposal may be edited as permitted by the locale rules database 1031. Only certain users of the system may be validated for such an operation. If the user is not validated, step S105 is skipped and the system proceeds directly from step S104 to step S106. At step S106, the system automatically creates, prints and saves a proposal using the information generated using the various subcomponent modules described above.

At step S107, the event manager 201A recognizes the proposal generation event and instructs the opportunity and forecast modules of the self management component 110 to update opportunity and forecast status to reflect the newly created proposal. Upon completion of the update, step S108, the updated opportunity status is transmitted to the back office system 200. It is noted that the salesperson support system 100 may be operated disconnected from the back office system 200. In this instance, the data is placed in the out box of the communication component 118A and is automatically transmitted at the next connected session with the back office system 200.

At step S109, the back office system 200 receives the updated opportunity status information at the communication manager in the communication component 118B. This information is transferred via the event manager 201A to the sales manager module of the sales management component 112B and is reflected in the database component 118B. At step S110, the sales management forecasts are now properly updated to reflect the proposal created using the salesperson support system 100.

Upon completion of step S110, the operation of the proposal generation is ended.

FIG. 17 illustrates the use of the system 20 (FIG. 2) during the order submission process. At step S201, an order process is initiated by the salesperson. If not, a message will be provided to the salesperson, otherwise the system proceeds to step S202. At step S202, the system checks order requirements by accessing the order requirements database 1013 of the manufacturer storage group 1010 via the event manager 201A and the data manager 1050 (FIG. 10A). The system then accesses the ° presentations and proposals database 1041 of the data component 116A to retrieve a configuration of the system to be ordered.

At step S204, the event manager 201A creates a work session file which is used to manage information related to the order. At step S205, the system automatically accesses the configuration module 406 to create or modify the configuration as needed.

At step S206, the system accesses the customer module to complete customer information as needed.

At step S207, the system prompts the user to enter any additional order information needed such as quantity, "ship to", "bill to" and special instructions.

The system then checks user status by referring to the locale rules database 1031 at step S208 to confirm that the user is granted valid access to submit an order. Assuming the user has access, the system proceeds to step S209 and transfers the order from the event manager 201A to the out box of the communications component 118A via the communication manager 1101A.

The event manager 201A recognizes the order submittal process and initiates a series of automatic steps. At step S210, the system stores a record of the order in the orders database 1042. At step S211, the system automatically updates the opportunity status of the opportunity module 704 of the self management component 110. At step S212, the to-do module 708 of the self management component 110 is accessed by the system and follow-up items are automatically added to the salespersons to-do list. Because the self management component 110 is fully integrated via the intelligent event manager 201A to the order management component 106, the system automatically creates the follow-up to do list and updates the opportunity status without requirement of any further interaction with the user.

At step S213, the system transmits the order to the back office system 200 via the communications component 118A out box at the next connected session. At step S214, the communication manager 1101B of the communication component 118B receives the order from the communication equipment 1103B. The communication manager notifies the information to the event manager 201B of the back office system 200. At step S215, the event manager transfers the order information to the enterprise system 209. The system also updates the sales management forecast in the sales management component 112B to reflect the order at step S216.

At step S217, the enterprise system notifies the communication manager out box, via the event manager 201B, of an order acknowledgment which is transmitted to the sales representative. At step S21B, the salesperson is notified of the acknowledgment. Upon completion of step S21B, the order submission process is complete.

FIG. 18 illustrates the process flow for a price information update operation. At step S301, pricing information is updated in the system. The pricing information may be updated using the configuration data tool of the data tools subsystem 305 or may be received from the pricing database of the enterprise system. At step S302, the price change is transferred to the global information storage of data component 116B. The updated data is also transferred via the event manager 201B to the communication manager of the communications component 118B.

At step S304, the system accesses the account data database 1071 of the data component 116B and checks the user data file for replication instructions. The price data is transferred at the next connect session at step S305.

At step S306, the updated price information is received by the communication manager of the communication component 118B. At step S307, the system updates the price file and marks old information as invalid in the configuration database of the data component 116A. The system also leaves an audit trail message in the out box of the communication component 118A for transfer to the back office system during the next connected session at step S308.

Finally, at step S309, the system may be used to automatically notify the salesperson of any outstanding quotes which are affected by the price change. Upon completion of step S309, the process ends.

As described above, each event occurring in the sales process is handled by an event manager which recognizes the event, notes the context in which the event occurs and automatically initiates additional action based on the event and its context. The operation of the event manager will be better understood by reference to the exemplary embodiments described below. These embodiments are provided by way of illustration, and not limitation, to demonstrate how the various types of information made available during the sales process can be used by an automated sales system to facilitate the sales process.

As described above, object oriented programming (OOP) may be used to implement the various subsystems. In such an implementation, the functionality of the various modules and subsystems may be implemented in the form of business objects. In such an implementation, the business objects can be the focal point of behavior in an OOP based sales system. For example, the business objects can trap application events (which represent actions by the user) and apply a set of behavior rules to the application events. A typical business object may provide or receive information to or from a user through the occurrence of an application event.

Application events in the disclosed embodiment are internal to the sales system and generally represent a sales event occurring in the sales process. In other words, a sales event may be an event in the sales process, typically occurring between the salesperson and the customer, while an application event may be an internal operation of the sales system (i.e., the operation of the software and hardware making up the sales system) which is used to electronically facilitate the sales event. In such a system, the occurrence of a sales event can be made known to the sales system by the occurrence of an application event. For example, the generation of a proposal for a customer is a sales event which occurs in the time with customer phase of the sales process. When the sales system is used to generate the proposal, a business object of the proposal generation module in the time with customer component typically will be used by the system. As described more fully below, such use of this business object will inform the sales system that the generation of a proposal has just occurred in the sales process. This information may then be used by the sales system to facilitate (or initiate) specified application events, which in turn drive sales events (e.g., to enter tasks into a to-do list for actions to be taken by the salesperson or to automatically carry out a task in the sales process).

As can be appreciated, in many instances a sales event and its related application event may be used interchangeably to describe an event. In the discussion below, where a distinction between the two types of events is useful, the terms sales event and application event are used. Where the discussion applies more generally to both types of events the term event may be used in a more generic form.

Figure 19:
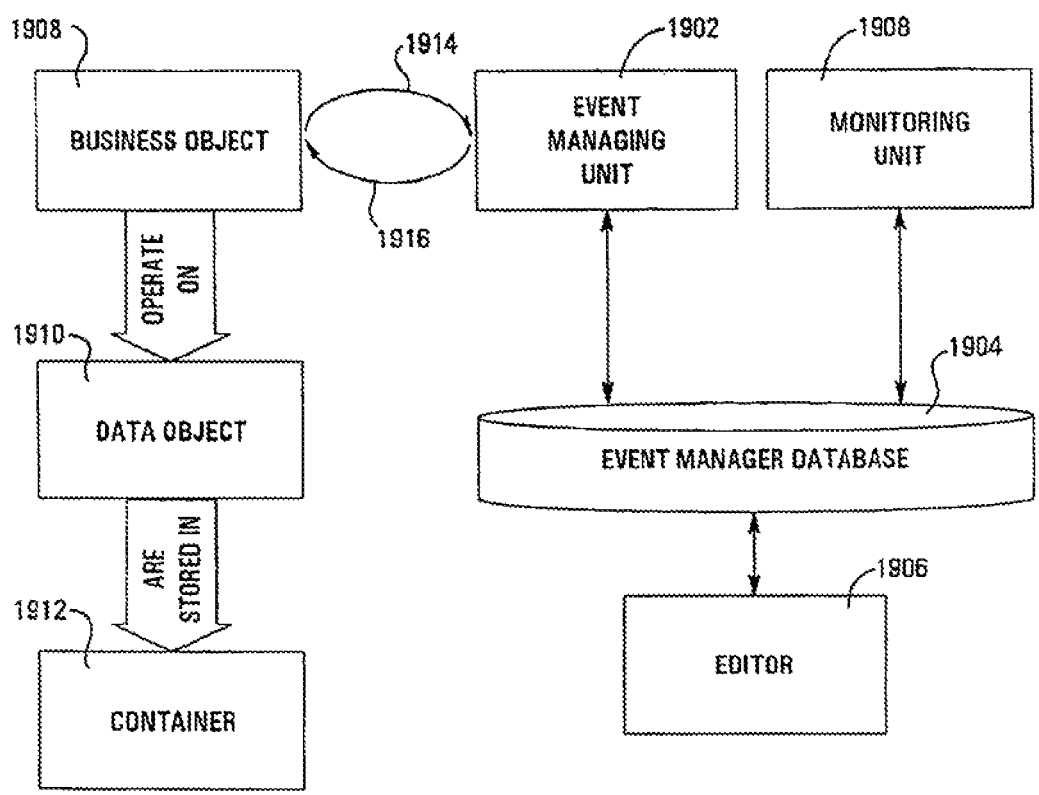
FIG. 19 illustrates, an event manager in accordance with an embodiment of the invention.

FIG. 19 illustrates an exemplary embodiment of an event manager 201. The event manager shown includes an event managing unit 1902 coupled to an event manager rules database 1904. An editor 1906, which is shown coupled to the event manager rules database 1904, and may be used to alter the contents of the event manager rules database 1904. The event manager rules database 1904 may also be viewed via a monitoring unit 1908, which typically is configured to provide for an administrative view of the event information. Also in FIG. 19, a business object 1908, a data object 1910 and a container 1912 are shown for purposes of illustrating the operation of the event manager 201.

Figure 20:
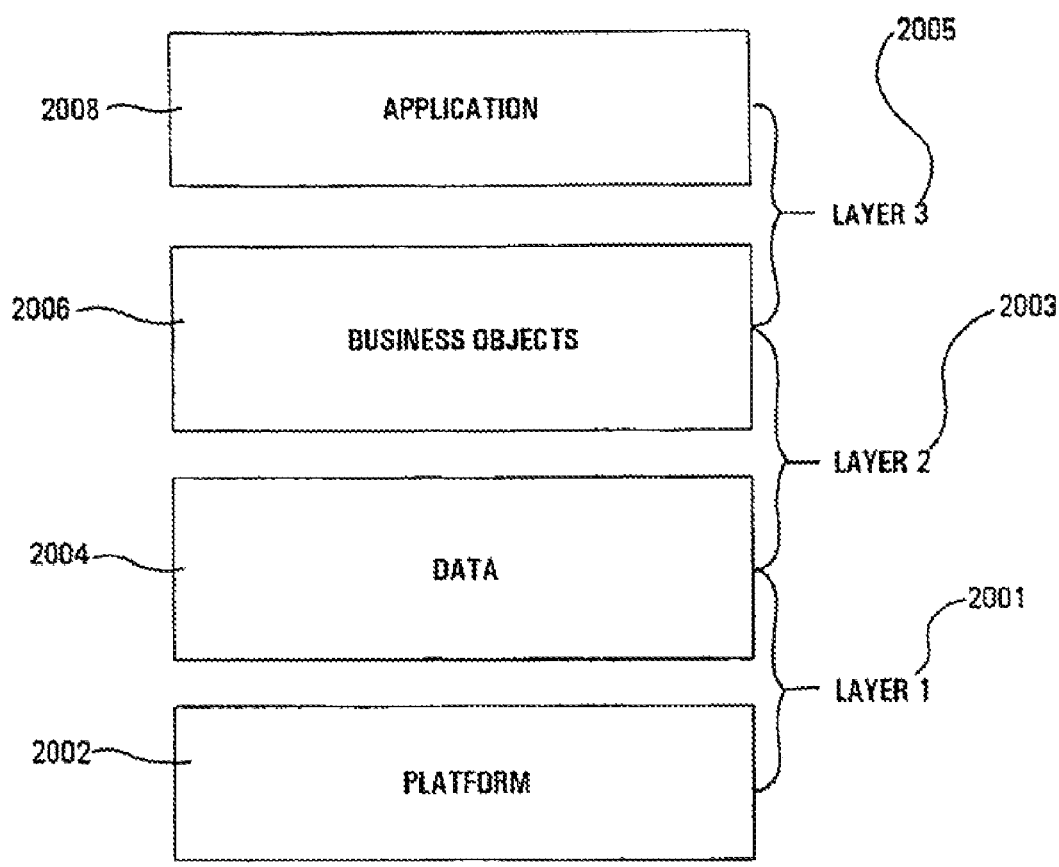
FIG. 20 illustrates a layered architecture in accordance with an embodiment of the invention.

In one embodiment, a system using an event manager as depicted in FIG. 19 is implemented in a layered architecture. An exemplary layered architecture is illustrated in FIG. 20. The layered architecture enables developers to change areas of the system without impacting areas outside the defined areas. The system shown has four layers; the platform layer 2002 (typically including operating systems, networks, peripherals, etc.), the data layer 2004, the business objects layer 2006 and the application layer 2008. In the embodiment illustrated, the layers communicate with each other through three defined protocols illustrated as protocol layers 2001, 2003 and 2005 between the platform layer 2002 and the data layer 2004, the data layer 2004 and the business objects layer 2006, the business objects layer 2006 and the application layer 2008, respectively.

The third protocol layer 2005 may be used to implement the intelligent operation of the system by establishing the interaction of events and actions between objects and applications as well as between objects themselves. In other words, events may be tied (or paired) together in the third protocol layer 2005. When one event occurs on this level (e.g., the generation of a proposal in the proposal generation module), the system automatically recognizes the event and its significance and may automatically initiate another event in the sales process (e.g., scheduling a follow-up in the time management module) on the third protocol layer 2005. In other words, the third protocol layer 2005 can be the layer on which pairing (or grouping) of application events occurs. However, as described more fully below, the grouping operation of the event manager depicted in FIG. 19 typically is driven on the basis of data. In this matter, the pairing or grouping of events may be considered as occurring on the second protocol layer 2003.

In the embodiment shown, the second protocol layer 2003 provides for communication within the system. As described above, the system may be implemented using distributed technology. Typical communication within such a system may be abstracted into four basic types: (1) Distribution; (2) Replication; (3) Transaction: and (4) Messaging. Communication on this protocol layer now will be briefly described.

Distribution generally refers to and includes en mass file copying. This would include general functions such as copy, move, create, delete, and the like. The distributed files and information types can be maintained in a number of different ways. For example, a version number may be used. Each file may be assigned a version number which changes when the content is changed. The distributed files can also be updated with changes which occur only in the system and not in the complete file. This type of change may be termed a net change. Files and information types can also be maintained with tokens. A token is set valid for a given period of time for a given user. This may also be used as a security mechanism of the system as well.

Replication may be used when a user does not need the entire set of information contained in a given source. Used in this manner, replication enables a user to receive relevant information only. This reduces the amount of information that is transferred during maintenance.

A Transaction operation may be used for information support. It typically includes functions such as insert, delete, select (query), post, commit, etc. This type of operation generally is more efficient when handling tabular information.

The Messaging function may be used to enable workflow in the system, such as by enabling the business objects to communicate state and status information with each other. For example, messaging operations may include post route, send, broadcast, receive, listen, etc.

Typical operation of the event manager 201 will now be described. In the disclosed embodiment, upon the occurrence of an application event using the business object 1908, the business object 1908 exposes 1914, the event and associated event handlers to the event managing unit 1904, and the information contained in the exposed event is used by the event managing unit 1902 to create or update a database in the event manager database 1904. On the basis of rules and state information stored in the event manager database 1904, the event managing unit 1902 may be configured to dynamically bind event handlers (in the form of an event map) to the exposed events (as represented by line 1916). The event handlers typically dictate further action to be taken by the system resulting from the occurrence of the particular sales event represented by the business object 1908.

As described above, a typical business object may provide or receive information to or from the user. The information may be taken from or put to a data object 1910 with the data objects stored in a container 1912. The container 1912 may be a special business object such as a repository for data objects that may or may not be operated on by the business object 1908.

In the embodiment described above, the event manager automatically binds a sales event to one or more other sales events as directed by the rules and other information in the event manager database 1904. The rules may prescribe that on the occurrence of a particular event, an event record is examined in the event manager database to determine if other related events have occurred, and if the other events have occurred, the rules may indicate that another sales event should be initiated.

By way of example, a sales event such as the introduction of a new incentive program for a specified product may occur. A business object associated with handling incentive programs may be used to update data related to incentive information in the system. The event manager may automatically recognize a change in the incentive program for the specified product, check to see if there are outstanding proposals for the specified product, and if so, direct a business object in the self management component to automatically generate a letter informing the customer of the new incentive program.

Further intelligence may be provided in the system to evaluate the context in which the sales event occurs (e.g., the significance of other information in the system). In the above example, the event manager may also check customer information, and determine whether the new incentive fits the customer profile. For example, the customer may have indicated a maximum down payment available to the customer. If the incentive program calls for a higher down payment, then a decision may be made that the incentive program need not be sent to the customer. In this manner, the context in which the sales event occurs (e.g., whether outstanding proposals exists, whether the incentive is inconsistent with customer profile information) may be used in connection with the occurrence of the event to determine what if any subsequent action should be taken by the system.

In the manner described above, different events may be paired (or grouped) together. In FIGS. 21A-21E, a table provides examples of how sales events may be linked together by the event manager database. In FIGS. 21A-21E, exemplary events are listed in column 2102. The exemplary components and related modules used to facilitate the sales events are listed in columns 2101 and 2103. In column 2104, examples are provided illustrating how a rules database in the event manager database 1904 may link the sales events to other sales events facilitated by the system. The provided examples are not exhaustive, but rather illustrate different types of events that may be paired to facilitate the sales process.

Referring again to FIG. 19, the rules applied by the event managing unit 1902 can be manually entered into the event manager data base 1904 using the editor 1906. In this manner, the operation of the system in response to a particular event can be altered by changing the information in the event manager database without altering the business objects used by the system. In other words, the subsequent automatic operations carried out by the system are driven by the contents of the event manager database 1904. This allows the system to be highly customizable without requiring extensive reprogramming of the business objects used to facilitate sales events. If desired, changes in the rules database may be made transparent to the business objects.

Figure 22:
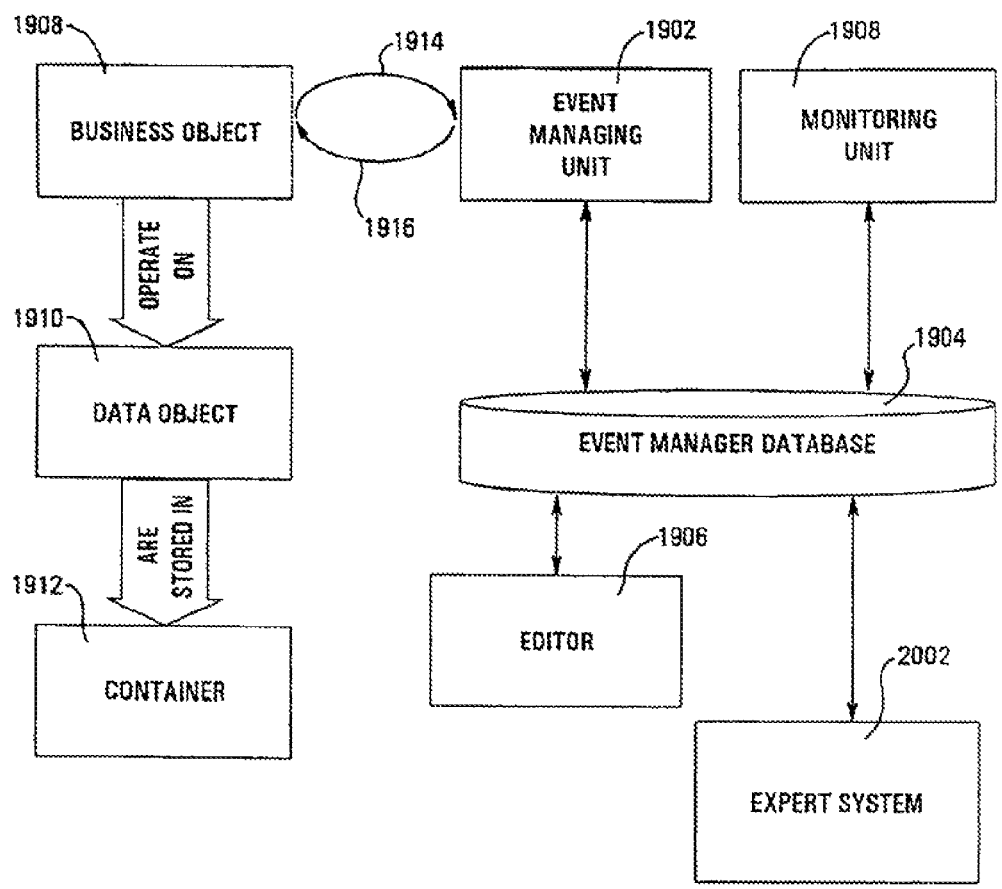
FIG. 22 illustrates another event manager in accordance with an embodiment of the invention.

FIG. 22 illustrates an alternative embodiment which incorporates an expert system 2002 which allows the system to learn successful sales approaches and automatically implement such approaches in future sales process. For example, the expert sales system may be programmed to monitor the sales processes for desired (successful) sales events. These events may include, for example, a customer purchase of a product, a repeat sale to a customer, a large number of leads being qualified to potential customers and the like. These events represent successes in the sales process. When a successful event occurs, the system preferably identifies the events or actions leading to the desired outcome. The expert system may then dynamically alter the rules in the event manger database 1904 to automatically initiate (or set different values for) the identified events or actions in similar subsequent sales activity.

The expert system 2002 may monitor a large number of successful events and determine the common characteristics of the events and actions leading to successful events and then change the rules on the basis of this experience. In this manner, the expert sales system allows the entire sales force to pool knowledge and experience such that the entire sales force gains from the shared experience. This allows the successful tactics of experienced salespeople to be provided as defaults for inexperienced salespeople. This also allows a generic sales system to be used in a particular sales environment or in a geographic region and to learn successful default operations to maximize the sales opportunities.

The expert system 2002 may also be implemented to predict the most successful course of action based on the information available to the system at the time a sales event occurs. For example, an inference engine may be incorporated into the expert system 2002 to select an appropriate course of action to be taken when prior events of interest suggest different, conflicting courses of action. Consider the above example, where a new incentive program is introduced. In addition to the previously described information, the system may have a vast amount of knowledge (or information) which may be useful to determine the best course of action. For example, based on prior experience, it may be determined that customers in the particular customers geographic region typically participate in the type of incentive program offered. This would suggest that it would be advisable to make appropriate offers, such as by sending out a letter. The system may also contain a record indicating similar incentive programs being rejected by the particular customer a number of times in the past. This would indicate that it might be better to leave the customer to consider the current outstanding proposal.

Such facts related to the event may be taken into consideration by an experienced salesperson to determine if and how the new incentive program should be presented to a particular customer. As can be appreciated, a large number of pieces of information available in the sales system may each be related to whether a subsequent action (e.g., sending out a letter) should be initiated. All of the potential scenarios in which the fact patterns may be developed may make it extremely difficult to code specific rules for making such a decision. Thus, in accordance with one embodiment of the system, an inference engine may be employed to make the decision of whether particular subsequent action should be taken.

A typical inference engine relies upon a number of independent rules which may be conceptualized as a number of statement in the form IF X THEN Y. In the above example, these rules may be of the form:

IF proposal exists for product THEN send letter;
IF insufficient down payment THEN no letter;
IF location is Midwest THEN send letter;
IF prior rejection THEN no letter.

In its most simple form, the inference engine may determine whether more rules indicate that a letter should be sent or not. The different rules could also be weighted to provide a heavier influence by some of the rules on the outcome. Moreover, the rules may be more complex such as IF X AND Z THEN Y. The above example is provided as a simplified illustration of the general operation of an expert system using an inference engine in the system of FIG. 22.

It is noted that such an expert system may be developed by generating rules based on the knowledge and experience of the most experienced salespeople. Then, a relatively inexperienced salesperson can use the system to facilitate a sale by automatically identifying events that suggest further action and by suggesting a best course of action based on the outcome of the rules. It is further noted that the rules used (e.g., in the inference engine) may examine vast amounts of information gathered during the sales process to suggest or initiate action. The volume of information available and considered may far exceed the amount of information that even an experienced salesperson would be capable of examining. Moreover, the system may be implemented so that information is automatically reviewed, eliminating the need to identify which information may be relevant each time the situation arises. Also, the time which would otherwise be spent retrieving and reviewing the information is now made available to the salesperson for other more productive activities.

It is also noted that, in dealing with additional customers, the rules used by an expert system employing an inference engine may be derived from actual experience. Successful tactics may be remembered by the system and used to drive the THEN statement for a particular set of facts.

The advantages of using the intelligence of an expert system extend across the various phases of the sales process. For example, the system can track customer profile information as it is gathered during the presales phase of the sales process and can correlate that to whether a sale is made by examining activities in the order management phase of the sales process. In this manner, the system may intelligently leverage such information to glean which types of presentations and proposals are effective with the particular customer profile and set this information as a default for the system whenever a similar customer profile is associated with a customer for which a presentation or proposal is being prepared. During the configuration process, specific types of information may be automatically tagged for inclusion in a presentation or proposal on the basis of the particular customer's profile. The intelligent ability to alter defaults for the system on the basis of the customer profile enhances the likelihood of a sale and reduces the workload of the salesperson.

Another example of using the knowledge base of the system is in generation of forecasts. The system may continually evaluate and track events and actions which predict outcome. Upon occurrence of a particular event or set of events, the system can dynamically update the probability of sale.

Figure 23:
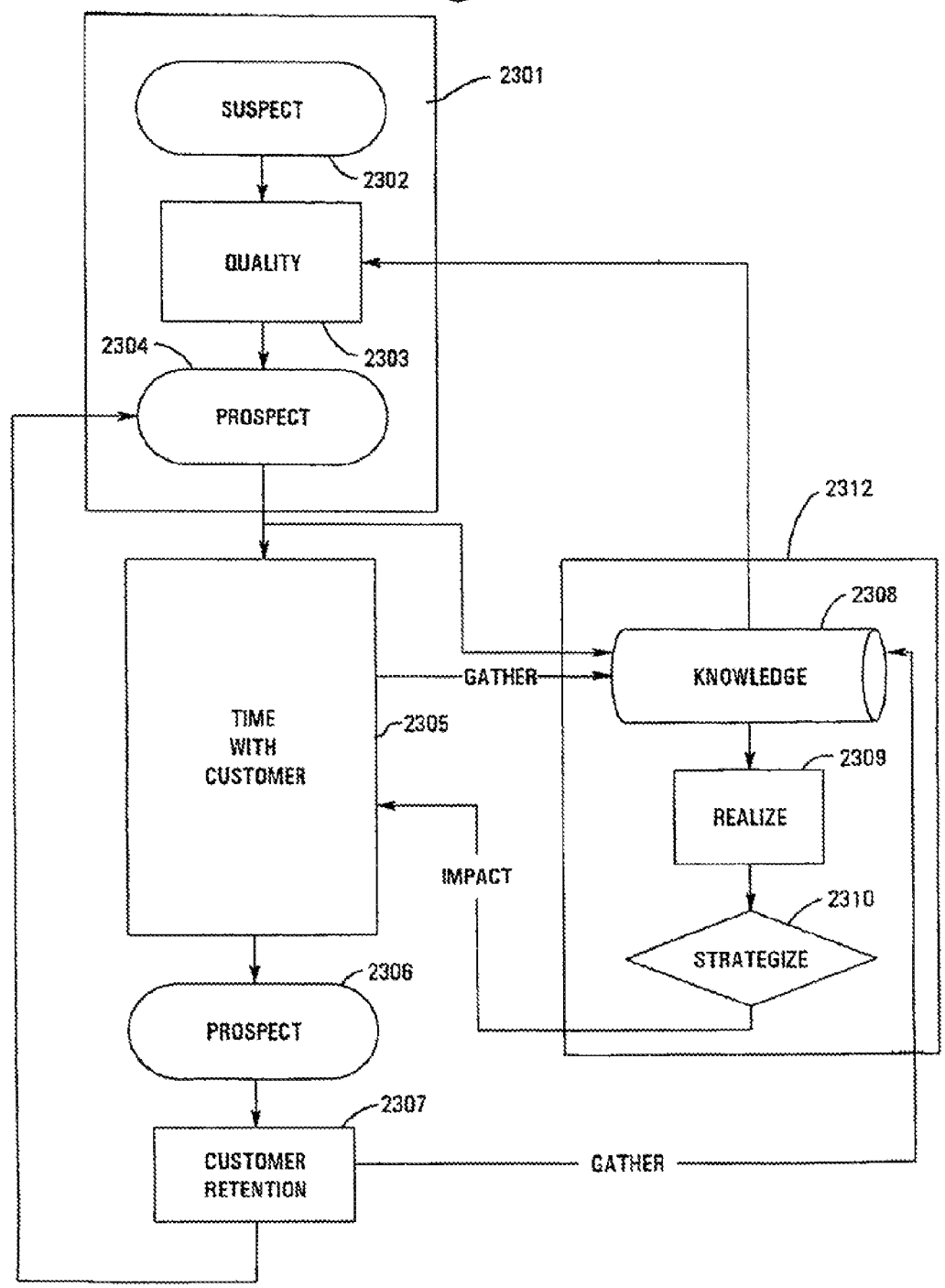
FIG. 23 illustrates interaction of an expert system with a sales process in accordance with an embodiment of the system.

FIG. 23 illustrates the general interaction of an expert sales system through various phases of the sales process. Four general phases of the sales process, (e.g., the lead generation phase 2301, the time with customer phase 2305, the order management phase 2306 and the customer retention phase 2307) are illustrated in FIG. 23. The lead generation phase 2301 includes three sub-phases which correspond to a salesperson receiving a lead (suspect) 2302, determining whether the lead can use the product to be sold (qualify) 2303, and generating a qualified lead (prospect) 2304.

An intelligent system 2312 typically interacts with each phase of the sales process as illustrated in FIG. 23. Such an intelligent system generally includes a knowledge database 2308, plus logic 2309 to realize the implication of the knowledge and logic to strategize 2310 based on the realized implication. As diagrammatically illustrated in FIG. 23, such a system will gather knowledge by monitoring the operation of the system in the various phases of the sales process (i.e., knowledge is gathered as the automated sales system is used to facilitate the sales process). Thus, the knowledge database 2308 may include information prior sales experience using the sales system and successful strategies employed in the prior uses. The gathered knowledge, as realized and strategized, is then used by the system to impact the overall sales process.

The foregoing description, which has been disclosed by way of the above examples and discussion, addresses embodiments of the present invention encompassing the principles of the present invention. The embodiments may be changed, modified and/or implemented using various types of arrangements. Those skilled in the art will readily recognize various modifications and changes which may be made to the present invention without strictly following the exemplary embodiments and applications illustrated and described herein, and without departing from the true spirit and scope of the present invention which is set forth in the following claims.

The invention claimed is:

1. An integrated sales system comprising:
a processor and a memory combined with the processor, the combined processor and memory being configured to execute a multistep sales process, the multistep sales process comprising:
converting a name to a potential customer lead,
converting a potential customer lead to a buying customer, so as to close a sale,
preparing a purchase order such that a product or service included in the purchase order matches a product or service sold and submitting the purchase order to a back office system,
converting an existing customer into a lead, so as to generate repeat sales, and
automating execution of the multistep sales process, preparation of the purchase order, and submission of the purchase order to the back office system so as to enable a salesperson to mange tasks related to execution of the multistep sales process, preparation of the purchase order, and submission of the purchase order to the back office system.

2. The integrated sales system of claim 1, the multistep sales process further comprising:
communicating the purchase order between the combined processor and memory and the back office system.

3. The combined processor and memory of claim 2, wherein the purchase order is communicated to the back office system via at least one of a local area network (LAN), a wireless local area network (WLAN), a wide area network (WAN), and the Internet.

4. The integrated sales system of claim 1, the multistep sales process further comprises at least one of:
assisting a salesperson in managing sales information;
assisting a sales manager in managing a plurality of salespeople; and
providing training to a salesperson.

5. A method comprising:
converting a name to a potential customer lead by a computer;
converting the potential customer lead to a buying customer by the computer, so as to close a sale;
generating a purchase order such that a product or service included in the purchase order matches a product or service sold by the computer;
transmitting the generated purchase order to a back office system by the computer; and
converting an existing customer into a known customer lead by the computer, so as to generate repeat sales.

6. The method of claim 5, further comprising:
updating a sales management forecast to reflect the purchase order transmission by the computer.

7. The method of claim 5, wherein at least one of the receiving and the transmitting are performed by the order management component via at least one of a local area network (LAN), a wireless local area network (WLAN), a wide area network (WAN), and the Internet.

* * * * *

UNITED STATES PATENT AND TRADEMARK OFFICE
CERTIFICATE OF CORRECTION

| | |
|---|---|
| PATENT NO. | : 8,271,355 B2 |
| APPLICATION NO. | : 13/093802 |
| DATED | : September 18, 2012 |
| INVENTOR(S) | : Jerome Dale Johnson et al. |

Page 1 of 1

It is certified that error appears in the above-identified patent and that said Letters Patent is hereby corrected as shown below:

At Column 39, line 19:

"mange" should read --manage--

Signed and Sealed this
Eighth Day of January, 2013

David J. Kappos
*Director of the United States Patent and Trademark Office*